(12) United States Patent
Applegate et al.

(10) Patent No.: US 9,905,019 B2
(45) Date of Patent: Feb. 27, 2018

(54) VIRTUAL APPAREL FITTING SYSTEMS AND METHODS

(71) Applicant: Ginman Group, Inc., San Francisco, CA (US)

(72) Inventors: Julianne Applegate, Matawan, NJ (US); Muhammad Ibrahim, Karachi (PK); Waqas Muddasir, Karachi (PK)

(73) Assignee: SelfieStyler Inc., San Francisco, CA (US)

(*) Notice: Subject to any disclaimer, the term of this patent is extended or adjusted under 35 U.S.C. 154(b) by 23 days.

(21) Appl. No.: 15/083,232

(22) Filed: Mar. 28, 2016

(65) Prior Publication Data

US 2017/0039775 A1 Feb. 9, 2017

Related U.S. Application Data

(60) Provisional application No. 62/202,454, filed on Aug. 7, 2015.

(51) Int. Cl.
*G06T 7/30* (2017.01)
*G06T 19/00* (2011.01)

(52) U.S. Cl.
CPC ............ *G06T 7/30* (2017.01); *G06T 19/00* (2013.01); *G06T 2210/16* (2013.01)

(58) Field of Classification Search
CPC ....... G06T 2210/16; G06T 2207/30196; G06T 17/00; G06T 2207/10004; G06T 13/40; G06T 7/75; G06T 2207/20212; G06T 2207/30124; G06Q 30/0643; G06Q 30/0601; G06Q 30/0603; G06Q 30/0621; G06Q 30/0269; G06Q 30/0253; G06Q 30/0641; G06F 2217/32
See application file for complete search history.

(56) References Cited

U.S. PATENT DOCUMENTS

2002/0130890 A1 9/2002 Karatassos et al.
2007/0182736 A1 8/2007 Weaver
(Continued)

FOREIGN PATENT DOCUMENTS

EP 1352347 10/2003
WO 02/057964 7/2002

OTHER PUBLICATIONS

International Search Report dated Nov. 22, 2016, issued in connection with PCT Application No. PCT/US2016/045380 (7 pages).

*Primary Examiner* — Haixia Du
(74) *Attorney, Agent, or Firm* — McDonnell Boehnen Hulbert & Berghoff LLP

(57) ABSTRACT

Embodiments disclosed herein include virtual apparel fitting systems configured to perform methods comprising generating a plurality of garment images for a garment based on a single digital image of the garment, wherein each garment image corresponds to a different size of the garment; generating a user image for a user based on a digital photograph of the user; receiving a selection comprising the garment; in response to receiving the selection comprising the garment, generating an image of the user wearing the garment based on an alignment of garment fit points in one garment image of the plurality of garment images with corresponding user fit points in the user image; and transmitting the image of the user wearing the garment to the user's computing device for display in a graphical user interface.

20 Claims, 13 Drawing Sheets

(56) References Cited

U.S. PATENT DOCUMENTS

| | | | |
|---|---|---|---|
| 2012/0313969 A1 | 12/2012 | Szymczyk et al. | |
| 2013/0305547 A1* | 11/2013 | Grove | A41H 3/007 33/17 A |
| 2014/0176565 A1 | 6/2014 | Adeyoola et al. | |
| 2014/0358738 A1* | 12/2014 | Ohnemus | G06Q 30/0643 705/27.2 |
| 2015/0269759 A1* | 9/2015 | Sekine | G06T 19/20 345/632 |

* cited by examiner

VIRTUAL APPAREL FITTING SYSTEMS AND METHODS

CROSS-REFERENCE TO RELATED APPLICATIONS

This application claims priority to provisional application 62/202,454 titled "Virtual Apparel Fitting Systems and Methods" filed on Aug. 7, 2015. The entire contents of the 62/202,454 application are incorporated herein by reference for all purposes.

FIELD

The embodiments disclosed herein relate to the field of online shopping of apparel, including systems and methods that allow a user to try on garments in a virtual environment to find a desired fit when purchasing the garment online.

BACKGROUND

As many online shoppers know, ordering products from the Internet can sometimes be a gamble. This is often true for retail clothing. Many consumers order garments online in what is advertised in their "typical" size only to find that the garment does not fit when it arrives. With the increasing number of styles and manufacturers of clothing available today, standard size information is becoming an increasingly poor indicator of the likelihood that a particular-sized garment will fit. Indeed, 50-70% of returns are due to poor fit, and 72% of people who do not shop online are afraid of poor fit and look.

There have been attempts to address this problem for both consumers and retailers since online shopping became available, including those described in U.S. Pat. Nos. 5,850,222; 6,546,309; 7,479,956; 7,548,794; 7,617,016; 7,714,912; 7,953,648; 8,174,521; and 8,275,590; as well as described in U.S. Patent Application Publication Nos. 2009/0115777; 2014/0176565; and 2014/0201023. Despite these contributions, however, the current online retail clothing shopping experience does not provide options for size selection that are any more reliable than its predecessor, the mail order catalogue. Thus, there remains a need in the art for technology that provides for more informed size selection during online apparel shopping.

SUMMARY

Some embodiments include systems and processes for virtual apparel fitting in an Internet environment. The process lets an online shopper (user) view an image of him or herself in the clothing via a computing device (e.g., a smartphone, tablet computer, laptop, or desktop computer), allowing for informed online purchasing decisions.

A virtual apparel fitting system according to some embodiments includes one or more web servers (and/or perhaps other network computing devices) that can be accessed remotely through a smart phone, tablet, laptop, or desktop computer. In operation, the virtual apparel fitting system provides for remote online shopping and fitting by allowing the user to access a website hosted on the one or re web servers and/or other network computing devices. Some embodiments include a full body image taken by the user through a mobile phone, digital camera, webcam, or other image capturing device, and submitted to the virtual apparel fitting system, as well as from answers to one or more online questionnaires, some embodiments disclosed herein extract data on key fit points for the user, and create a two-dimensional (2-D) image(s) three-dimensional (3-D) model(s) of the user, and/or 2-D image(s) of 3-D models of the user. Additionally, some embodiments include capturing and storing (i) key fit points of the garment via imaging studies on a mannequin, and (ii) 2-D and 3-D data and images of garments displayed on a mannequin.

In some embodiments, a user selects a garment to virtually try on, and the system generates one or more images of the user wearing the garment for display within a graphical user interface (GUI) of a user's computing device. In some embodiments, the one or more images may include a 2D image of the user wearing the garment and/or an image of a 3-D model of the user wearing the garment. Additionally, some embodiments generate a quantitative indicator of fit (sometimes referred to herein as a fit index) for the user to gauge the level of fit of a particular garment. In this way, a user can (i) see how the particular garment would look on them without actually wearing the garment and (ii) obtain an indication of the relative fit of the garment according to the user's fit preferences. In operation, a user can try on hundreds of different garments (or perhaps sets of garments or outfits) in a quick and efficient manner to see how each garment (or outfit) would look on his or her body, and obtain accurate and informed sizing information about the garment (or outfit). In addition to helping users select garments, the disclosed embodiments are also beneficial to retailers by providing detailed customer data, reducing returns, and attracting more customers by making the online shopping experience more reliable.

Some embodiments include one or more of (i) a Photo Grading Sub-Process, (ii) a User Mapped Sub-Process, (iii) a Fit Point Alignment Sub-Process, (iv) a Style Patterned Sub-Process, (v) a Preference Driven Sub-Process, and/or (vi) a Raster Mapped 3-D Apparel Sub-Process.

In some embodiments, the Photo Grading Sub-Process creates a sized range of images for a garment (one image for each size of the garment) based on a size specification for the garment. Typically, a manufacturer has a size specification (sometimes referred to herein as grade rules) that defines relationships between the different sizes of a particular garment. Some embodiments of the Photo-Grading Sub-Process may include one or more of (i) setting photography parameters for a camera, (ii) capturing mannequin dimensions through a series of calibration photos, (iii) setting coordinate points on the mannequin image to establish points of adjustment for manipulating images of garments placed on the mannequin, (iv) selecting a garment to be the correct size for the mannequin and placing the garment on the mannequin, and (v) changing the clothing image from one size to another in a virtual manner by manipulating the number of pixels within an image of a garment to shrink or stretch the image according to the manufacturer's size specifications defined in the manufacturer's grade rules for the garment.

For each size (e.g., women's size 2, size 4, size 6), the number of pixels at the data points is changed in proportion to the differences in the amount of fabric between sizes at fit points on the garment according to the manufacturer's grade rules. In this way, a garment image for each size of a garment is created that is directly proportional to the real size of the actual garment. For example, a garment image for a size 2 of the garment has a number of pixels that is proportional to the amount of fabric used to manufacture the actual size 2 of the garment while a garment image for a size 4 of the garment has a comparatively greater number of pixels that is proportional to the comparatively greater amount of fabric used to manufacture the actual size 4 garment (as compared to the size 2 garment). In operation, images are scaled (e.g., by adding or removing pixels) between different fit points of the garment based on the actual amount of fabric (measured in inches and/or fractions of inches, for example) between fit points of the physical garment.

In some embodiments, a User Mapped Sub-Process captures and codes a specific user's body measurements to generate a two-dimensional (or perhaps three-dimensional) body model for that specific user. In operation, the user registers with the system via a registration process and an online questionnaire during which the user identifies certain body characteristics and provides a full body digital photograph (e.g., via a camera on a smart phone or tablet or perhaps other digital camera). In some embodiments, the user adjusts a mask marker (silhouette) to define where the edges of his or her body are located in the digital photograph. In some embodiments, the system may extract an image of the user from the digital photograph. The User Mapped Sub-Process then extracts coordinates from the mask marker to determine pixel length for key fit points on the user's body and generates a two and/or three-dimensional user body model (including one or more user images, for example) for the user based on the user fit points extracted from the image of the user.

In some embodiments, a Fit Point Alignment Sub-Process aligns the image of the user's body and fit points in the image of the user's body with posture alignment and fit points of an image of a mannequin. In some embodiments, the Fit Point Alignment Sub-Process may include one or more of (i) setting coordinate points on the mannequin image to establish location of body landmarks, and/or (ii) from the digital photo of the user, using vector points on a mask marker (silhouette) to define where the edges of the user's body and key body landmarks of the user are located within the digital photo of the user. The user's digital photo is then adjusted to shift the user's body landmarks to align with the mannequin body landmarks.

In some embodiments, a Style Patterned Sub-Process captures and codes each garment's key measurement points. This Sub-Process uses manufacturer specification data and qualitative and quantitative data about fabric and garment characteristics to ultimately generate a fit index for each size of the garment. In some embodiments, data representing key measurement points of the garment are recorded from the manufacturer's garment specifications. Then characteristics such as fabric structure, fabric stretch and percentage adjustable garment features, fabric grain, and layered wearing are coded. Then, based on measurements of the manufacturer's fit model, the ideal fit in the manufacturer's fit model size is identified. Then, a weighting factor for one or more measurement points of the garment is established by analyzing garment drape and the key measurement points of the manufacturer's ideal fit for the garment. The weighting factor is then used to calculate a fit index, which quantifies how the user body model compares to the fit model. Finally, from the relationship between the user body model and fit model, a style patterned relationship specific to how each size of any garment fits the user body model may be generated.

In some embodiments, a Preference Driven Sub-Process accommodates user preferences for fit. Data from the User Mapped Sub-Process and Style Patterned Sub-Process are combined to fit the user in the garment. Then, the fit is modified based on learned user preferences such as whether the user prefers a tighter or looser fit, whether the user prefers longer or shorter sleeve length, and so on. In some embodiments, this is achieved by creating a user body model as described previously, providing a questionnaire to the user and receiving answers on user preferences about how loose or tight the user prefers his or her clothes at key measurement points (and perhaps other fit data), generating a user preference key based on the answers, modifying the fit model with the user preference key, and modifying the fit index to base the fit index on the user's preferred fit. In some embodiments, user preferences for fit may additionally or alternatively be based on user feedback from prior purchases, reasons why the user returned certain purchases in the past, or perhaps based on other user interactions with the system or with retailers.

In some embodiments, a Raster Mapped 3D Apparel Sub-Process captures and joins two-dimensional imagery with three-dimensional wire frames to create one or more images of a three-dimensional model of the user in the garment based on the Style Patterned Sub-Process and User Mapped Sub-Process. Some embodiments include capturing a 360° image of the garment displayed on the mannequin, generating a three-dimensional model of the exterior of the garment through scanning, draping the three-dimensional model with the 360° image, and using the parameters of the User Mapped Sub-Process, Preference Driven Sub-Process, and/or Style Patterned Sub-Process to manipulate the image and display image(s) of the 3-D model of the user in the garment.

Some embodiments may also include Body Mirroring Avatars, which create and display an avatar to mirror the user's body shape, dimensions, weight, and height in virtual Body mirroring avatars are described in more detail herein.

Some embodiments include a process for virtual apparel fitting. The process may comprise one or more of the following in any combination and in any order. In the process, a two-dimensional full body image may be received from a user. A two-dimensional image of a garment for selection by a user may be displayed on a mannequin. Then, body landmarks of the user may be aligned with body landmarks of the mannequin. Next, user dimension data and fit points from the two-dimensional full body image of the user may be used to create a three-dimensional user body model. Next, a 360° raster image of the garment displayed on the mannequin may be captured. Next, a three-dimensional model of the exterior of the garment displayed on the mannequin may be captured. Next, the three-dimensional model of the exterior of the garment may be draped with the 360° raster image data to create a 3-Dimensional model of the garment. Finally, the three-dimensional user body model and the 3-Dimensional model of the garment may be combined to display image(s) of the 3-D model of the user in the garment based on the fit points of the user and the fit points of the garment. In operation, a user can rotate or otherwise manipulate the 3-D model of the user in the garment with the GUI to display images of the user wearing the garment from the front, sides, back, left and right perspectives, and so on.

In another embodiment, the process may comprise one or more of the following in any combination and in any order. In the process, a two-dimensional full body image may be received from a user. First, a two-dimensional image of a garment for selection by a user may be displayed on a mannequin. Then, body landmarks of the user may be aligned with body landmarks of the mannequin. Next, user dimension data and fit points from the two-dimensional full body image of the user may be captured and coded. Next, the garment's measurement points may be captured and coded. Next, the manufacturer's ideal fit in their fit model size may be identified. Next, a weighting factor for each measurement point may be established. Finally, the fit index for each size of the garment may be assigned by analyzing the relationship between the user body model and fit model based on the weighting factor.

Still further embodiments comprise a server system configured to perform aspects of a virtual apparel fitting process including one or more of the following in any combination and in any order: (i) generating a plurality of garment images for a garment based on a single digital image of the garment (or perhaps multiple digital images of the garment), wherein each garment image of the plurality of garment images corresponds to a different size of the garment; (ii) generating a user image for a user based on a digital photograph of the user or perhaps multiple user images for the user based on multiple digital photographs of the user); (iii) receiving a selection from the user comprising the garment, e.g., via a GUI of a computing device; (iii) in response to receiving the selection of the garment from the user, generating an image of the user wearing the garment based on an alignment of garment fit points in one game age of the plurality of garment images with corresponding user fit points in the user image; and (iv) displaying the image of the user wearing the garment via the GUI.

In some embodiments, generating a plurality of garment images for a garment based on a single digital image of the garment, wherein each garment image corresponds to a different size of the garment may comprise: (i) receiving a digital image of a mannequin wearing a reference size of the garment; (ii) generating a reference image for the reference size of the garment by removing the mannequin from the digital image of the mannequin wearing the reference size of the garment, wherein the reference image comprises a plurality of reference image regions; (iii) generating a first garment image for a first size of the garment, wherein the first size is smaller than the reference size, wherein generating the first garment image comprises shrinking the reference age in each reference image region by an amount corresponding to a difference between (a) an amount of fabric within each of a plurality of physical regions of the reference size of the garment, wherein each physical region of the reference size of the garment corresponds to a reference image region in the reference image and (b) an amount of fabric each of a plurality of physical regions of the first size of the garment, wherein each physical region of the first size of the garment corresponds to a reference image region in the reference image; and (iv) generating a second garment image for a second size of the garment, wherein the second size is larger than the reference size, wherein generating the second garment image comprises expanding the reference image in each reference image region by an amount corresponding to a difference between (a) an amount of fabric within each of a plurality of physical regions of the reference size of the garment, wherein each physical region of the reference size of the garment corresponds to a reference image region in the reference image and (b) an amount of fabric within each of a plurality of physical regions of the second size of the garment, wherein each physical region of the second size of the garment corresponds to a reference image region in the reference image.

In some embodiments, generating the user image for the user based on the digital photograph of the user may comprise: (i) receiving the digital photograph of the user; (ii) determining prospective user fit points for the user in the digital photograph; (iii) aligning the prospective user fit points with technical mannequin fit points in an image of a technical mannequin; and (iv) shifting the prospective user fit points in the digital photograph of the user to align with the technical mannequin fit points.

Some embodiments may further comprise: (i) generating a fit index for the garment based at least in part on a difference between (a) a value of a measurement point of the user and (b) a value of a corresponding measurement point of a fit model for the garment; and (ii) transmitting the fit index for the garment to the user's computing device for display in the graphical user interface.

Some embodiments may include displaying one or both of (i) an image of the user wearing the garment in a virtual fit and/or (ii) a fit index for the garment. The image of the user wearing the garment in a virtual fit may include one or more of (i) a 2-D image of the user wearing the garment, (ii) an image of a 3-D model of the user wearing the garment. In operation, the image of the user wearing the garment and/or the fit index may be displayed in a graphical user interface (GUI) accessible via a computing device through a web browser, or perhaps via a GUI in a smartphone or tablet based software application. One or both of the image of the user wearing the garment and/or the fit index allow the user to assess the likelihood that a particular size and style of garment fits the user and/or gauge the extent to which a particular size and style of garment fits the user.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

DETAILED DESCRIPTION

Figure 1:
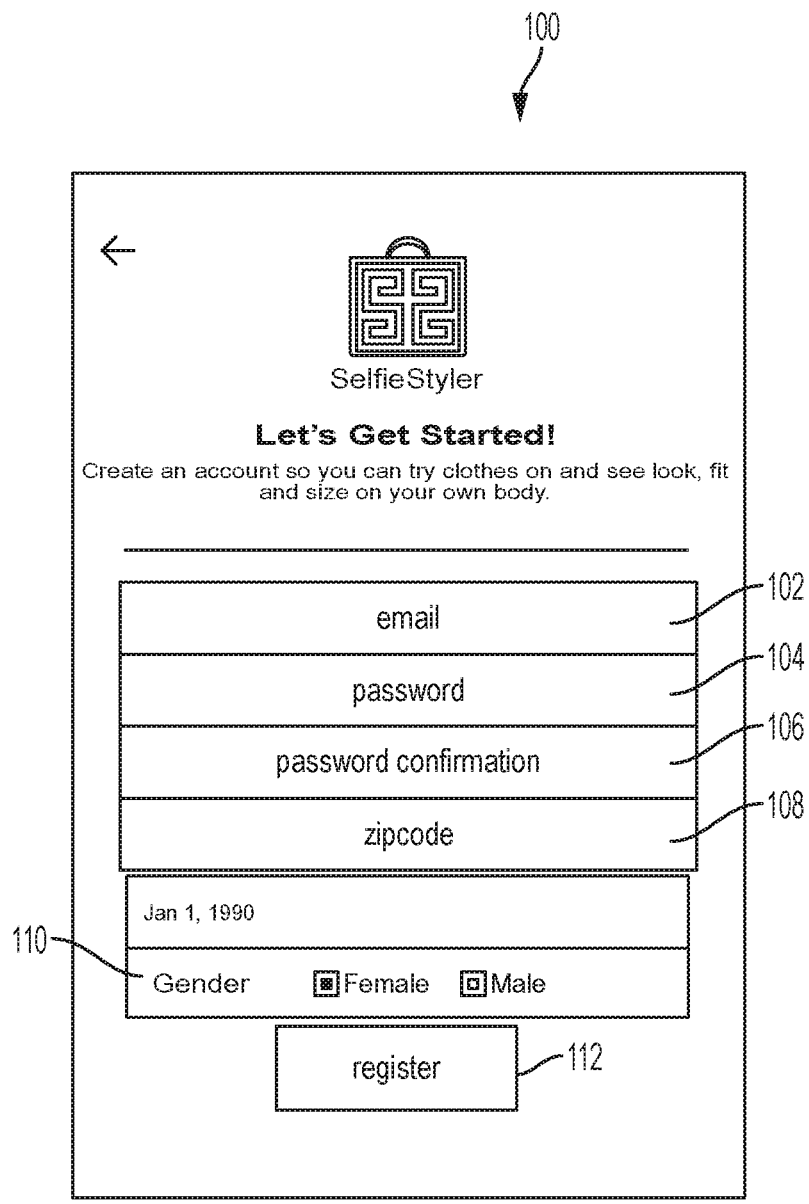
FIG. 1 is a screen shot of a GUI showing an example user registration screen according to some embodiments.

The embodiments, shown, disclosed, and described in the figures and specification are set forth as examples. As such, those skilled in the art will appreciate that other arrangements and elements (e.g., machines, interfaces, functions, orders, and groupings of functions) can be used instead, and that some elements may be omitted altogether. Further, many of the elements shown and described herein are functional entities that may be implemented as discrete or distributed components or in conjunction with other components, and in any suitable combination and location. Various functions described herein as being performed by one or more entities may be carried out by hardware, firmware, and/or software (and any combination thereof). For example, one or more processors executing instructions stored in one or more tangible computer-readable memory components may implement one or more of the features and functions described herein.

Some embodiments comprise tangible, non-transitory computer readable media comprising instructions encoded thereon, where the instructions, when executed by one or more processors, cause one or more computing devices (for example, a user's computing device individually or in combination with a server system, or perhaps a server system individually or in combination with a user's computing device) to execute one or more methods comprising a series of one or more processes and/or sub-processes to generate a virtual fit for a garment for a user. In some embodiments, the sub-processes (or perhaps functions thereof) may be performed successively, simultaneously, or intermittently with other sub-processes (or perhaps functions thereof). Further, it is envisioned that some of the steps and/or functions of the sub-processes may be changed, may be substituted for, may be combined with other steps and/or functions of other sub-processors, or may be eliminated. Further, it is envisioned that some sub-processes and other disclosed methods may include additional steps not explicitly shown or described herein. The methods, processes, and sub-processes described herein are merely exemplary and those skilled in the art will recognize modifications that fall within the scope and spirit of the inventions disclosed and described herein.

Some embodiments include a process comprising one or more of the following: (i) a Photo Grading Sub-Process adapted to create an array of garment images; (ii) a User Mapped Sub-Process adapted to capture a user's body measurements; (iii) a Fit Point Alignment Sub-Process adapted to align one of the garment images (and/or models) with a 2-D image (and/or 3-D model) of a user's body; (iv) a Style Patterned Sub-Process adapted to compare a virtual fit of a garment on a user's body with a manufacturer's standard fit for the garment; (v) a Preference Driven Sub-Process to account for user garment fit preferences; and (vi) a Raster Mapped 3-D Apparel Sub-Process adapted to visually illustrate a virtual fit of the garment on the user's body. An overview of each of these sub-processes is described herein followed by a detailed description of the drawings, which show various aspects of example embodiments of systems and methods implementing various virtual apparel fitting functions, including but not limited to (i) the sub-processes and/or portions and/or variations of aspects of the sub-processes and/or (ii) other functions performed by embodiments of the virtual apparel fitting systems disclosed and described herein.

Overview of Example Embodiments

Photo Grading Sub-Process

Some embodiments may comprise a Photo Grading Sub-Process that includes generating a set of 2-D garment images and/or 3-D garment models corresponding to various sizes of the garment from a single 2-D reference image and/or 3-D model of the garment. In some embodiments, the Photo-Grading Sub-Process includes one or more of: (i) capturing or otherwise obtaining at least one digital image of a garment on a mannequin; (ii) establishing a number of set points (e.g., fit points) in the digital image of the garment that are used for re-sizing the image of the garment in a virtual manner; and/or (iii) manipulating the image of the garment at one or more of the set points (or fit points) to re-size the image of the garment, where the image manipulation is based on size rules for the garment (sometimes referred to herein as garment "grade rules") as established by the manufacturer of the garment. In some embodiments, the at least one digital image of the garment on the mannequin may include multiple images of the garment on the mannequin, such as a front view image, a side view image, a rear view image, and so on.

Some embodiments of the Photo Grading Sub-Process may additionally or alternatively include one or more of: (i) providing a mannequin having a selected clothing size; (ii) providing a garment with the same selected clothing size as the mannequin; (iii) obtaining one or more digital images of the garment on the mannequin; (iv) scaling the image such that a desired number of pixels of the image corresponds with a 1-inch measurement (or perhaps another scale) of the garment determining how many pixels in the image correspond to an inch of fabric in the garment on the mannequin); (v) establishing a number of set points (or fit points) for re-sizing the image of the garment; and (vi) choosing one or more of the set points and re-sizing the image of the garment by moving the chosen set points some number of pixels based on (a) the number of pixels in the image corresponding to an inch of fabric of the garment on the mannequin and (b) the size rules (or "grade rules") for the garment as established by the manufacturer of the garment.

The output of one or more functions of the Photo Grading Sub-Process is a set of garment images, where each garment in the set corresponds to a particular size of the garment. For example, if a garment is available in sizes 0, 2, 4, 6, and 8, then the set of garment images includes a garment image for size 0 of the garment, a garment image for size 2 of the garment, a garment image for size 4 of the garment, a garment image for size 6 of the garment, and a garment image for size 8 of the garment. In operation, from a single "reference" image of the garment on a mannequin of the same garment size, a virtual apparel fitting system configured to execute one or more functions of the above-described Photo Grading Sub-Process generates a set of garment images for the garment based on one or more fit points in the reference image and the manufacture's grade rules for the garment, where each garment image looks as though it was photographed on an appropriately-sized mannequin. For example, the garment image for size 2 of the garment looks as though it was photographed on a size 2 mannequin while the garment image for size 10 of the garment looks as though it was photographed on a size 10 mannequin, but both the size 2 garment image and the size 10 garment image instead generated by digitally manipulating a single photo of one size of the garment (e.g., a size 6) on an appropriately-sized mannequin (e.g., a size 6 mannequin).

In operation, one photo (the reference photo) of one size of the garment (the reference size) is taken on a mannequin. Once the reference photo is uploaded to the virtual apparel fitting system, the system creates a set of garment images, where each garment image corresponds to a particular size of the garment. In operation, creating the set of garment images may include numerical micro adjustments (e.g., adding, removing, expanding, shrinking, or other adjustments) of pixels in the reference photo. In some embodiments, adjustment increments may be related to the reference photo and the manufacturer's grade rules. Further, the same or similar process could be following for a front view, side view, and rear view of the garment. For example, (i) a single front view reference photo of the garment could be used to create a plurality of front view garment images, where each front view garment image corresponds to a particular size of the garment, (ii) a single side view reference photo of the garment could be used to create a plurality of side view garment images, where each side view garment image corresponds to a particular size of the garment, and (iii) a single rear view reference photo of the garment could be used to create a plurality of rear view garment images, where each rear view garment image corresponds to a particular size of the garment. More, fewer, and/or different views could be used as well.

Some embodiments of the Photo Grading Sub-Process may include one or more of the following steps, not necessarily in the order shown below.

Step 1. Setting technical photo parameters, which may include setting photography parameters of camera height, depth of field and image resolution for the mannequin that is used for the creating the reference image.

Step 2. A mannequin calibration step, which may include taking a series of calibration two dimensional and/or three dimensional photos and/or three dimensional scans to capture mannequin dimensions and to set image scale. The calibration photos and/or scans can be taken with a cloth measuring tape wrapped around each of the head, neck, chest, waist, hip, thigh, knee, calf, ankle, triceps, bicep and wrist of the mannequin. The mannequin can be measured laterally for shoulder width, torso lengths, arm length and inseam. A contractor's tape measure or yardstick can be used to set the inch scale without rotation. Additional or alternative measurements of the mannequin's size and dimensions could be captured as well.

Step 3. Setting Fit Points, which may include setting one or more fit points or coordinate points) on the mannequin image to establish points of adjustment on the reference image that can be manipulated to create the sized range of garment images. Some embodiments include up to 48 or more unique fit points on the mannequin image. But some embodiments may include fewer than 48 points of adjustment. In some embodiments, any combination of fit points can be used to change one size and/or shape of a garment in the reference garment image to generate another garment image for another size of the garment. For example, less than all of the fit points of a reference garment image of a size 2 of the garment may be manipulated to create a garment image for a size 2 petite, e.g., only a select few fit points relating to length, including a shorter bodice, shorter skirt length, higher arm holes for a dress, and/or other fit points based on the manufacturer grade rules.

Step 4. A setting photo grade parameter step, which may include configuring one or more manipulation formulas that are used for changing the clothing image from one size to another generating one or more garment images from the reference garment image). To make larger or smaller sizes each point is manipulated to stretch or shrink the image in specific increments at one or more of the set points (or fit points). The incremental adjustments are unique to the garment and garment size and are based on the grade/size rules used by the manufacturer. In one example, if a manufacturer's size 4 pant is 2 inches larger in the waist and 2.5 inches larger in the hip than that manufacturer's size 2 pant, then the front view of the reference garment image (the garment image for the size 2 pant) can be manipulated such that one or more of the waist fit points LW1 (Left Waist-1), LW2 (Left Waist-2) RW1 (Right Waist-1), and RW2 (Right Waist-2) are stretched some number of pixels corresponding to half of the size increase (or 1 additional inch of fabric), and that the hip fit points LH1 (Left Hip-1), LH2 (Left Hip-2), RH1 (Right Hip-1), RH2 (Right Hip-2) are each stretched some number of pixels corresponding to half of the size increase (or 1.25 additional inches of fabric). The reference garment image stretched by half of the size increase in this example because the increase in size from the size 2 to the size 4 of the pants is an increase in the total circumference of the pants at the waist and hip, respectively; however, the reference garment image only shows the front of the pants, and it is assumed that half of the increase is in the front of the pants shown in the reference garment image and half of the increase is in the back of the pants that is not shown in the reference garment image. In this way, the garment image for the size 4 pant (the garment) has more pixels than the reference garment image for the size 2 pant in a way that is proportional to how the actual size 4 pant has more fabric than the actual size 2 pant.

Step 5: Obtaining a technical photo of the mannequin wearing the reference size of the garment, which includes (i) placing the garment (the reference size of the garment in particular) on the mannequin and (ii) taking a photo (two-dimensional and/or three-dimensional) using established technical photo parameters. In operation, the size of the reference garment preferably matches the size of the mannequin. For example, a size 2 reference garment is photographed on a size 2 mannequin. Similarly, a size 6 reference garment is photographed on a size 6 mannequin.

Step 6: Photo grading, which may include clipping the technical photo of the mannequin wearing the garment (the reference size of the garment in particular). In operation, the technical photo of the mannequin wearing the reference size of the garment is edited to remove any background to obtain the reference garment image. In some embodiments, the reference garment image is resealed so that 60 pixels in the reference garment image are equal to 1 inch of fabric in the reference size of the garment. However, the 60 pixels to 1 inch scale is arbitrary and could be set higher to achieve more detail or lower for less detail. In other embodiments, the image is resealed so that 1 inch of fabric in the reference size of the garment is the equivalent to anywhere from 1 to 100 (or perhaps even more) pixels, such as for example 2, 3, 4, 5, 10, 12, 14, 16, 18, 20, 22, 24, 28, 32, 36, 40, 44, 48, 52, 56, 60, 64, 68, or 72 pixels, where a higher pixel-per-inch ratio provides higher resolution garment image and a lower pixel-per-inch ratio provides a lower resolution garment image. In some embodiments, the reference image may be manipulated manually with image processing software to adjust the garment image fit points based on one or more photograde parameters to create each garment image for each size of the garment. In other embodiments, one or more server components of the virtual apparel fitting system may perform the scaling/re-sizing of the reference garment image by applying one or more image processing algorithms to generate each garment image based at least in part on fit points in the reference garment image and the manufacturer's grade rules for the garment, as described in more detail herein.

Step 7: An application scale adjustment step, which include rescaling each garment image in the set of garment images for different screen resolutions, thereby enabling the generated garment images to be viewed on screens having different screen resolutions. For example, smartphone screens typically display images having smaller resolutions number of pixels) whereas tablet, desktop, or laptop computers typically display images having higher resolutions (greater number of pixels).

Although some aspects of the description of the Photo-Grading Sub-Process are described with reference to single 2-D images, the Photo-Grading Sub-Process could also be preformed with 3-D models instead of in addition to 2-D images. For example, in further embodiments, the Photo-Grading Sub-Process includes one or more of: (i) capturing or otherwise obtaining a 3-D model of a garment on a mannequin; (ii) establishing a number of set points (e.g., fit points) in the 3-D model of the garment that are used for re-sizing the 3-D model of the garment in a virtual manner; and/or (iii) manipulating the 3-D model of the garment at one or more of the set points (or fit points) to re-size the 3-D model of the garment, where the 3-D model manipulation is based on size rules for the garment (sometimes referred to herein as garment "grade rules") as established by the manufacturer of the garment.

In embodiments configured for use with 3-D models, the output of one or more functions of the Photo-Grading Sub-Process is a set of 3-D garment models, where each 3-D garment model in the set corresponds to a particular size of the garment. For example, if a garment is available in sizes 0, 2, 4, 6, and 8, then the set of 3-D garment models includes a 3-D garment model for size 0 of the garment, a 3-D garment model for size 2 of the garment, a 3-D garment model for size 4 of the garment, a 3-D garment model for size 6 of the garment, and a 3-D garment model for size 8 of the garment. In operation, from a single "reference" 3-D garment model of the garment, a virtual apparel fitting system configured to execute one or more functions of the above-described Photo Grading Sub-Process generates a set of 3-D garment models for the garment based on one or more fit points in the reference 3-D garment model and the manufacturer's grade rules for the garment where images of each 3-D garment model look as though they were photographed on an appropriately-sized mannequin. For example, images of the 3-D garment model for size 2 of the garment look as though they were photographed on a size 2 mannequin while images of the 3-D garment model for size 10 of the garment look as though they were photographed on a size 10 mannequin, but both the size 2 3-D garment model and the size 10 3-D garment model were instead generated by digitally manipulating a single 3-D garment model of one size of the garment (e.g., a size 6) based on an appropriately-sized mannequin (e.g., a size 6 mannequin).

In operation, one 3-D garment model (the reference 3-D garment model) of size of the garment (the reference size a be based on a mannequin. Once the reference 3-D garment model is uploaded to the virtual apparel fitting system, the system creates a set of 3-D garment models, where each 3-D garment model corresponds to a particular size of the garment. In operation, creating the set of 3-D garment models may include numerical micro adjustments (e.g., adding, removing, expanding, shrinking, or other adjustments) of voxels in the reference 3-D garment model. In some embodiments, adjustment increments may be related to the reference 3-D garment model and the manufacturer's grade rules.

User Mapped Sub-Process

Some embodiments may comprise one or more aspects of a User Mapped Sub-Process for capturing and coding a user's measurements. Typically, a user takes and uploads a full body technical photograph to the virtual apparel fitting system. For embodiments that include a smartphone application configured to take and upload the full body technical photo to a server of the virtual apparel fitting system, the smartphone application configures the smartphone camera with parameters for capturing a photograph of sufficient quality for use by the virtual apparel fitting system. Some embodiments may also include applying a mask marker to the full body photo of the user to distinguish the user's body in the photo from the background in the photo. The virtual apparel fitting system may also use the mask marker to identify at least some of the user's body dimensions from the photo.

Some embodiments where the virtual apparel fitting system uses the User Mapped Sub-Process (or variations thereon) to capture the user's body measurements may comprise one or more of: (i) obtaining a 2-D image and/or 3-D model of the user's body; (ii) applying a mask marker overlay to the 2-D image (or 3-D model) of the user's body; (iii) adjusting points on the mask marker overlay to define where edges of the user's body are located in the 2-D image (or 3-D model); (iv) extracting coordinates from the mask marker overlay to determine fit point data for the user by determining pixel length values or voxel dimensions) for one or more various fit points (e.g., the user's head, neck, chest, shoulder width, torso length, arm lengths, waist, hip, thighs, ankles, biceps, triceps, wrists, and/or perhaps other fit points); (v) assigning the user fit point data to a profile for the user; and/or (creating a 2-D image and/or 3-D model from the image (and/or model) of the user's body and user fit point data.

Some embodiments of the User Mapped Sub-Process may include one or more of the following steps, not necessarily in the order shown below.

Step 1. A registration step where the user answers questions in a registration process to identify his or her body characteristics, such as height, weight, body type shoe size, bra size, and/or perhaps other measurements, for example.

Step 2. Using a smartphone application, a user takes a full body picture of him or herself for uploading to a server of the virtual apparel fitting system. In some embodiments, the smartphone application may provide directions for taking a good quality full body photo for use by the virtual apparel fitting system. In such embodiments, the directions can include one or more of the

- for most accurate results, please be barefoot & wearing tight fitting clothes or bathing suit;
- the smartphone should be placed on a table 30" tall;
- we recommend balancing the smartphone against the back of a laptop or other device to achieve the level position indicated with the green checkmark;
- once the smartphone is set up for taking the photo, press the timer & stand facing the camera of the smartphone;
- stand straight with arms relaxed at your sides;
- center your body with the red center line;
- tips of your toes should align with the red line at bottom of the screen;
- smile!

Although the example instructions listed above instruct the user to place the smartphone on a table about 30" tall, in some embodiments, the instructions for one type of smartphone may be different than the instructions for other types of smartphones to account for differences in smartphone configurations. Preferably, the instructions for how high and how to orient the smartphone are based on the position of the smartphone camera lens so that photos taken by different smartphones are taken from similar camera perspectives.

Step 3. Once the image is taken, the photo that the just took appears with a mask marker overlay within the graphical user interface (GUI) of the smartphone application. The smartphone application directs the user to adjust the body silhouette vector mask points in the mask marker overlay to define where the edges of the body are located within the image. In some embodiments, a server component of the virtual apparel fitting system may instead perform the mask marker application to identify edges of the user's body in the photo and to distinguish the user's body in the photo from the background in the photo.

Step 4. A mask marker analysis step includes extracting coordinates from mask marker overlay to determine pixel length values for fit points in the photo of the user, including for example, fit points for the user's head, neck, chest, shoulder width, torso lengths, arm length, waist, hip, thigh, ankle, bicep, triceps, wrist, and/or perhaps other fit points. In operation, the fit point values are stored in the user's profile, which is stored in memory of the virtual apparel fitting system, e.g., in a database associated with and/or accessible by a server component of the virtual apparel fitting system. In some embodiments, the virtual apparel fitting system (e.g., a server of the system) may additionally analyze the fit point data in the user image to generate user-specific datasets for use in other aspects of some embodiments disclosed and described herein.

Some embodiments may alternatively include the user providing both (i) a calibration photo comprising a background, and (ii) a photo comprising the user standing in front of the background in the calibration photo. The server system can then extract an image of the user from the photo of the standing in front of the background by comparing the calibration photo with the photo of the user standing in front of the background.

Figure 10:
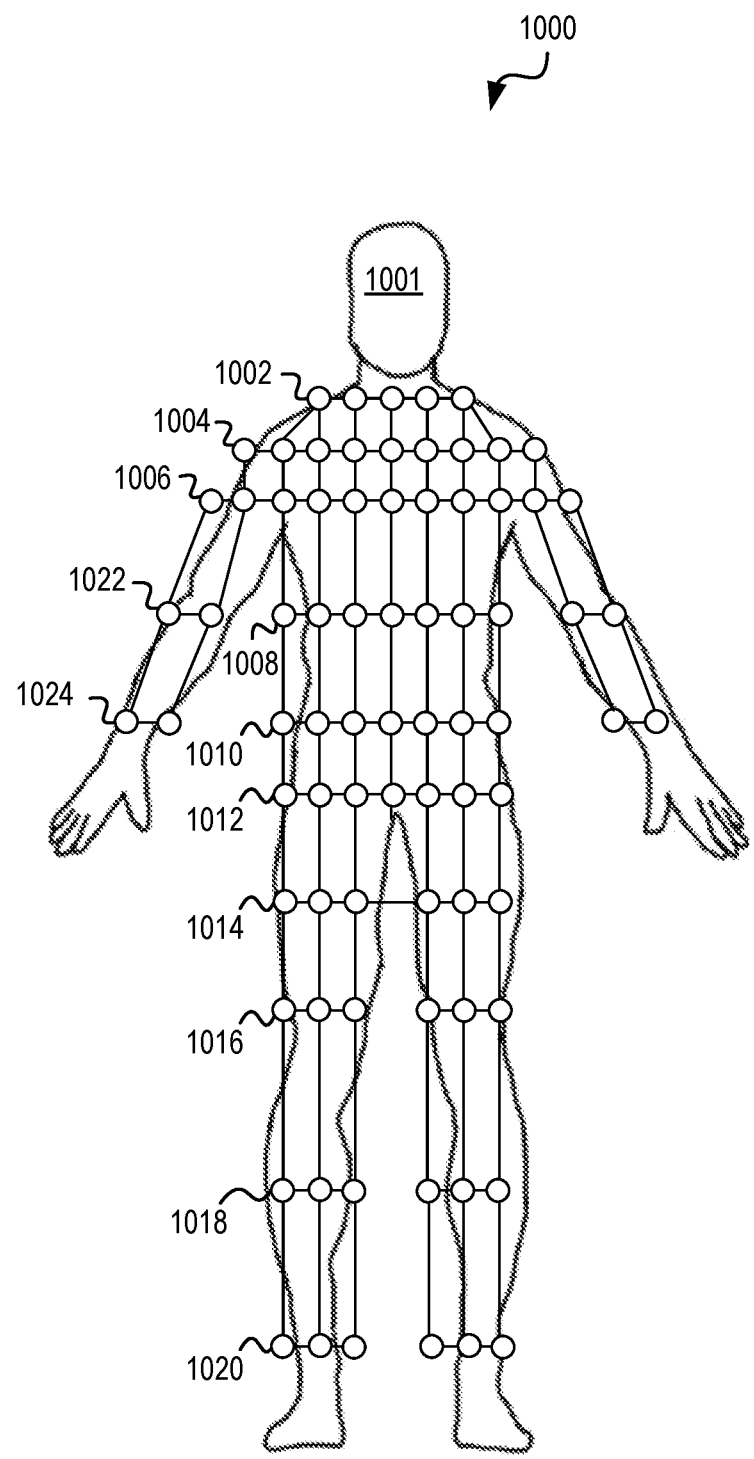
FIG. 10 is a diagram showing fit points in a user image for use with some aspects of the disclosed embodiments.

Step 5: Generating one or both of a 2-D user image and/or 3-D user model comprising the user fit points. One example of a 2-D user image comprising user fit points is shown in FIG. 10, which shows a diagram with fit points 1002-1024 in a user image 1000 of a user 1001 for use with some aspects of the disclosed embodiments, as described in further detail herein.

Fit Point Alignment Sub-Process

Some embodiments may also include a Fit Point Alignment Sub-Process which includes aligning user fit points in a user image (e.g., a user image created via the above-described User-Mapped Sub Process) to mannequin fit points in a mannequin image so that one or more garment fit points in a garment image (e.g., a garment image created via the above-described Photo Grading Process) can be aligned with one or more corresponding user fit points in the user image for generating an image of the user wearing the garment (or a particular size of the garment).

In some embodiments, the Fit Point Alignment Sub-Process includes aligning body landmarks of an image of the user's body (user fit points in the user image) with body landmarks of an image of a mannequin (mannequin fit points in a mannequin image) via one or more of the following steps: (i) setting coordinate points on a mannequin image to establish the location of the mannequin fit points; (ii) receiving a 2-D image of a user's body; (iii) applying a mask marker overlay to the image of the user's body; (iv) adjusting points on the mask marker overlay to define where edges of the user's body are located in the image of the user's body; (v) determining the user fit points based on vector points of the mask marker overlay; and (vi) shifting the user's fit points to align with the mannequin's fit points.

In some embodiments, the Fit Point Alignment Sub-Process additionally or alternatively aligns the user's fit points in the user a with the mannequin's posture alignment and the mannequin's fit points in the mannequin image. The Fit Point Alignment Sub-Process enables garment images to be placed on the user image so that both are aligned, or at least improves the virtual apparel fitting system's ability to align one or more garment fit points in a garment image with one or more corresponding user fit points in a user image.

Some embodiments of the Fit Point Alignment Sub-Process may include one or more the following steps, not necessarily in the order shown below.

Step 1. A Technical Mannequin Posture Position step includes setting coordinate points on a mannequin image to establish the location of body landmarks (i.e., mannequin fit points) on the mannequin image, including for example, top of head, center of neck, edges of shoulders, elbow, wrist, chest, waist, hips center of crotch, knee, ankle, toes, and/or perhaps other mannequin fit points.

Step 2. A User Posture Mask Marker step includes using a mask marker to define the edges of the user's body in a photograph of the user's body and to identify the edges of the user's body and to distinguish between the user's body in the photo and the background in the photo. Some embodiments may additionally or alternatively including comparing a first photo including a background image (a calibration photo) with a second photo of the user standing in front of the background image in the first photo to extract an image of the user from the second photo.

Step 3. A User Posture Position step includes determining one or more user fit points in the user image based on one or more mask marker vector points.

Step 4. A Fit Point Alignment Image Adjustment step includes adjusting the user image within a set tolerance to shift the user fit points in the user image to align with the mannequin fit points in the mannequin image. In some embodiments, the Fit Point Alignment Image Adjustment includes manually aligning the user fit points in the user image with corresponding mannequin fit points in the mannequin image via image processing software. In other embodiments, the virtual apparel fitting system (or perhaps a server component of the virtual apparel fitting system) may be configured to automatically align user fit points in the user image with mannequin fit points in the mannequin image.

Although the Fit Point Alignment Sub Process is described with reference to 2-D images of the user and a mannequin, the Fit Point Alignment Sub Process could additionally or alternatively be implemented with 3-D models of the user and the mannequin. For example, in such embodiments, the Fit Point Alignment Sub-Process includes aligning body landmarks of a 3-D body model of the user's body (user fit points in the 3-D body model) with body landmarks of a 3-D body model of a mannequin (mannequin fit points in a 3-D mannequin model) via one or more of the following steps: (i) setting coordinate points on a 3-D mannequin body model to establish the location of the mannequin fit points; (ii) receiving a 3-D user body model of a user's body; (iii) applying a mask marker overlay to the 3-D body model of the user's body; (iv) adjusting points on the mask marker overlay to define where edges of the user's body are located in the 3-D body model of the user's body; (v) determining the user's fit points based on vector points of the mask marker overlay; and (vi) shifting the user's fit points to align with the mannequin's fit points.

Style Patterned Sub-Process

Some embodiments may also include a Style Patterned Sub-Process that includes determining an individual garment's key measurement points. The "key measurement points" are the measurement points of the garment that are most important for determining whether and/or the extent to which the garment (or at least a particular size of the garment) will fit a particular user.

In some embodiments, the Style Patterned Sub-Process includes: (i) storing data corresponding to garment measurement points from the garment manufacturer's specifications and perhaps other garment data such as fabric type and/or drape characteristics; (ii) storing a weighting factor for one or more garment key measurement points, wherein individual weighting factors are expressed as a percentage and together total 100%; and (iii) comparing how a user's measurements predicted from an analysis of a user image (and/or perhaps from the user's actual body measurements from information from the user's profile) compares to the garment manufacturer's fit model for the garment in a selected size, and expressing the comparison as a fit index of a value from 0 to 10 (or perhaps some other range, e.g., 1 to 5, 1 to 100, or some other range of values). In operation, garment data from the garment manufacturer's garment specifications, user measurement points (and perhaps other user information) are compared with garment key measurement points and qualitative and quantitative data about the garment fabric and other characteristics that affect fit and wear ability.

Some embodiments of the Style Patterned Sub-Process may include one or more the following steps, not necessarily in the order shown below.

Step 1. A garment dimensions collection step includes receiving and storing data corresponding to key measurement points for a particular garment (and perhaps size of garment) from the garment manufacturer's garment specification for that particular garment. The key measurement points may include one or more measurement points selected from the shoulder width, top torso length, bottom torso length, rise, inseam, arm length, neck, chest, waist, hip, thigh, triceps, bicep, wrist, high point shoulder to hem, waist to hem, and/or other fit points. In operation, different garments have different key measurement points.

Step 2. A Garment/Fabric Dynamic Characteristics collection step includes receiving and storing characteristics about the garment, including but not limited to the garment's fabric structure (knit/woven/felt), the fabric stretch type and percentage, adjustable garment features like draw string closures, fat weight, fabric stiffness fabric grain (as it relates to drape and stretch), and/or whether the garment is intended for layered wearing (for example, a tee shirt might be worn close to the skin whereas a coat is worn over layers). Other garment/fabric characteristics about a particular garment could be stored as well.

Step 4. A Fit Model Relational Size step includes identifying the garment manufacturer's "ideal fit" for the garment manufacturer's fit model. The manufacturer's fit model corresponds to the body measurements for which the manufacturer designed the garment. In operation, different manufacturers have different fit models; some manufacturers may have different fit models for different garments. For example, a manufacturer's fit model for a "slim fit" garment might be different than the manufacturer's model for a "big and tall" garment. Some embodiments may also include determining a percentage or other measure of fabric ease at key measurement points of the garment in relation to the manufacturer's fit model. If a fit model for a particular manufacturer or particular garment is not available, the fit model can be estimated based on the median values of the manufacturer's size chart for the garment.

Step 3. A Weighting Factor setting stet includes storing a weighting factor for one or more key measurement points for the garment. The weighting factor for a particular key measurement point for a garment may be based on one or more of the garment drape, fabric type, stretch parameters, etc. and the dimensions of the manufacturer's fit model for that garment. The weighting factor for a key measurement point s set at a percentage value, where the higher the percentage value, the more critical it is that the garment fit the user within the recommended measurement range for that key measurement point. In some embodiments, the sum of the weighting factors for each of the key fit points of the garment must add up to 100%.

Step 4. A Fit Index step includes calculating a fit index for a particular size of a particular garment that quantifies at least in part how well the user's measurements match the garment manufacturer's fit model for that particular size of that particular garment based at least in part on how well the key measurement points for that particular size of that particular garment align with corresponding user measurements points on the user's body, and/or perhaps a difference between (i) a value of a measurement point of the user and (ii) a value of a corresponding measurement point of a fit model for that size of the garment. In operation the more closely that the user's body measurements match the garment manufacturer's fit model for that garment, the better the garment is likely to fit the user.

Step 5. A Style Pattern Fit Estimate step includes estimating how well a particular manufacturer's garment and/or garment style would fit the user based on one or more of (i) the user's Fit Index relative to the manufacturer's fit model, and/or (ii) how well key measurement points in the garment align with corresponding user measurement points (and/or perhaps a difference between a value of a measurement point of the user and a value of a corresponding measurement point of a fit model for that size of the garment.

Preference Driven Sub-Process

Some embodiments may also include a Preference Driven Sub-Process to accommodate user preferences for fit, e.g., if a particular user prefers a looser-than-standard fit, a tighter-than-standard fit, a longer-than-standard fit, a shorter-than-standard fit, and/or perhaps other user preferred deviations from a standard fit.

In some embodiments, the Preference Driven Sub-Process accounts for user garment fit preferences and includes one or more of the following steps: (i) creating a user body model; (ii) creating a user ideal fit model based on user preferences regarding how loose or tight the user prefers clothes to fit at one or more fit points; (iii) optionally refining the user's ideal fit model based on user feedback from items purchased; (iv) for a particular garment, determining a weighting factor for one or more key measurement points of the garment based on the user's fit preferences, wherein each weighting factor is expressed as a percentage and where all of the weighting factors together total 100%; and (v) generating a fit index for a garment based on one or more of the user's body model, the user's ideal fit model, and the weighting factors for the key measurement points of the garment.

In some embodiments, the Preference Driven Sub-Process includes (i) creating a custom fit profile for the user for a particular size of a particular garment based at least in part on a combination of data from the User Mapped Sub-Process and the Style Pattern Sub-Process and (ii) optionally revising the user's custom fit profile based on learned or specified user preferences.

Body Mirroring Avatars

Some embodiments include mapping one or more user images e.g., one or more of 2-D images or perhaps a 360° image) onto a body mirroring avatar that mirrors the user's body shape and dimension, weight, and/or height. Some embodiments may alternatively use body mirroring avatars without mapping user images onto avatars.

Raster Mapped 3-D Apparel Sub-Process

Some embodiments may further include a Raster Mapped 3-D Apparel Sub-Process that includes mapping 2-D garment images and/or 2-D user images onto 3-D wire frames to create 3-D models of the user wearing garments.

In some embodiments, the Raster Mapped 3-D Apparel Sub-Process includes one or more of: (i) receiving a 360° raster image of a reference garment displayed on a mannequin; (ii) receiving a 3-D scan of the reference garment on the mannequin and creating a 3-D model image of the exterior of the garment displayed on the mannequin based on the 3-D scan; (iii) aligning the 3-D model image with the 360° raster and draping the raster image over the 3-D model image to create a 3-D garment image; combining a 3-D user model with the 3-D garment model to generate a 3-D model of the user wearing the garment; and/or (v) optionally modifying the 3-D model of user wearing the garment based on user and/or garment manufacturer preferences. In some embodiments, the Raster Mapped 3-D Apparel Sub-Process could be used in combination with one or more of the other sub-processes and/or other features and functions disclosed and described herein.

DETAILED DESCRIPTION OF THE FIGURES

FIG. 1 is a screen shot of a Graphical User Interface (GUI) showing an example user registration screen 100 according to some embodiments.

Registration screen 100 enables a new user to register with the virtual apparel fitting system. To register with the virtual apparel fitting system, a user enters an email address into field 102, enters a password into password field 104, enters the password again into the confirm password field 106 enters a zipcode into zipcode field 108, indicates a gender via gender selection field 110, and activates the register button 112 within the registration screen 100. After registering with the virtual apparel fitting system, the user may thereafter provide additional information to the virtual apparel fitting system as described herein. Some embodiments may include additional or fewer fields in a registration screen. For example, some embodiments may not include zipcode field 108. Similarly, some embodiments may include fields for the user's name and mailing address for example.

Figure 2:
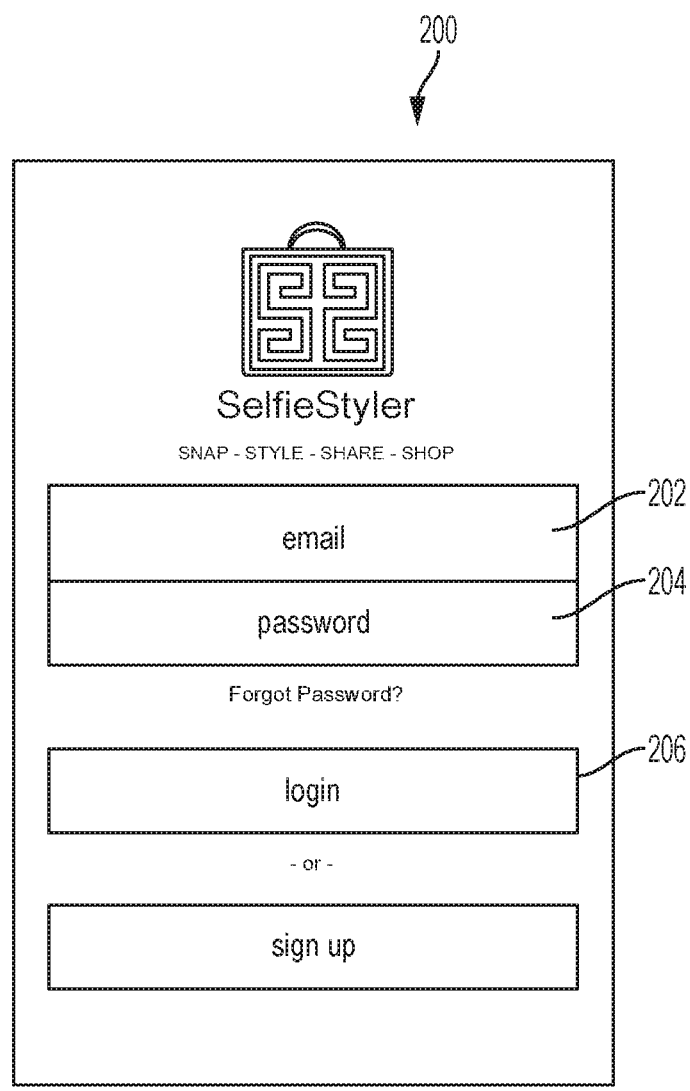
FIG. 2 is a screen shot of a GUI showing an example login screen according to some embodiments.

FIG. 2 is a screen shot of a GUI showing an example login screen 200 according to some embodiments. Once a user has registered with the virtual apparel fitting system, the user may login to the virtual apparel fitting system via login screen 200 by entering the user's registered email into email field 202, entering the user's password into the password field 204, and activating the login button 206. Some embodiments may include additional or fewer fields in a login screen.

Figure 3:
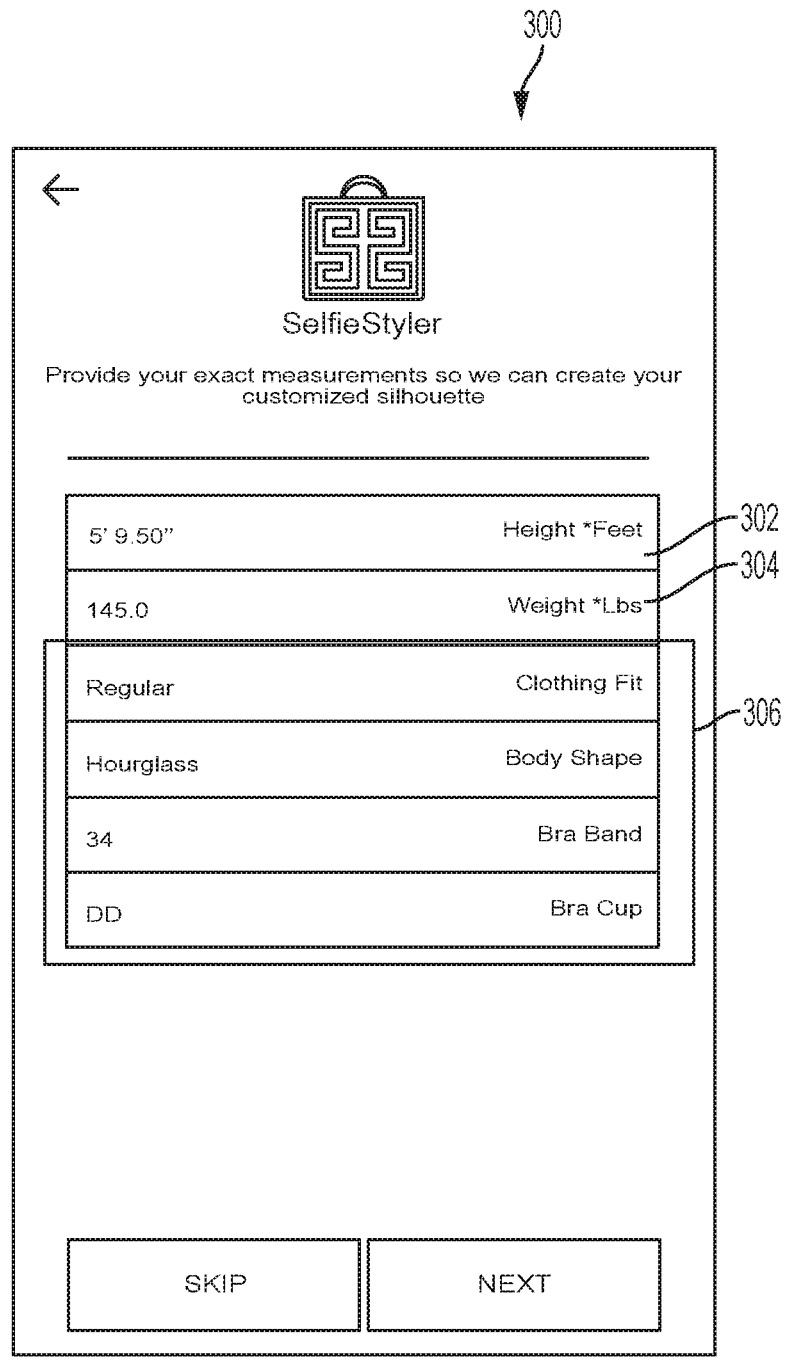
FIG. 3 is a screen shot of a GUI showing an example input screen for capturing body characteristics and sizes according to some embodiments.

FIG. 3 is a screen shot of a GUI showing an example input screen 300 for capturing body characteristics, measurements, and sizes from a user according to some embodiments. After registering with the virtual apparel fitting system (FIG. 1) and/or logging in to the virtual apparel fitting system (FIG. 2), the user provides his or her body characteristics and/or measurements to the virtual apparel fitting system via input screen 300 by entering his or her height into height field 302, entering his or her weight to weight field 304, and entering other body characteristics, measurements, and/or size information into other body measurement fields 306. Some embodiments may include additional or fewer fields for capturing body characteristics, measurements, and sizes. For example, in some embodiments, input screen 300 may additionally or alternatively include information on the user's dress size, coat size, shirt size, pant size, and/or other sizing information and/or body measurements.

Figure 4:
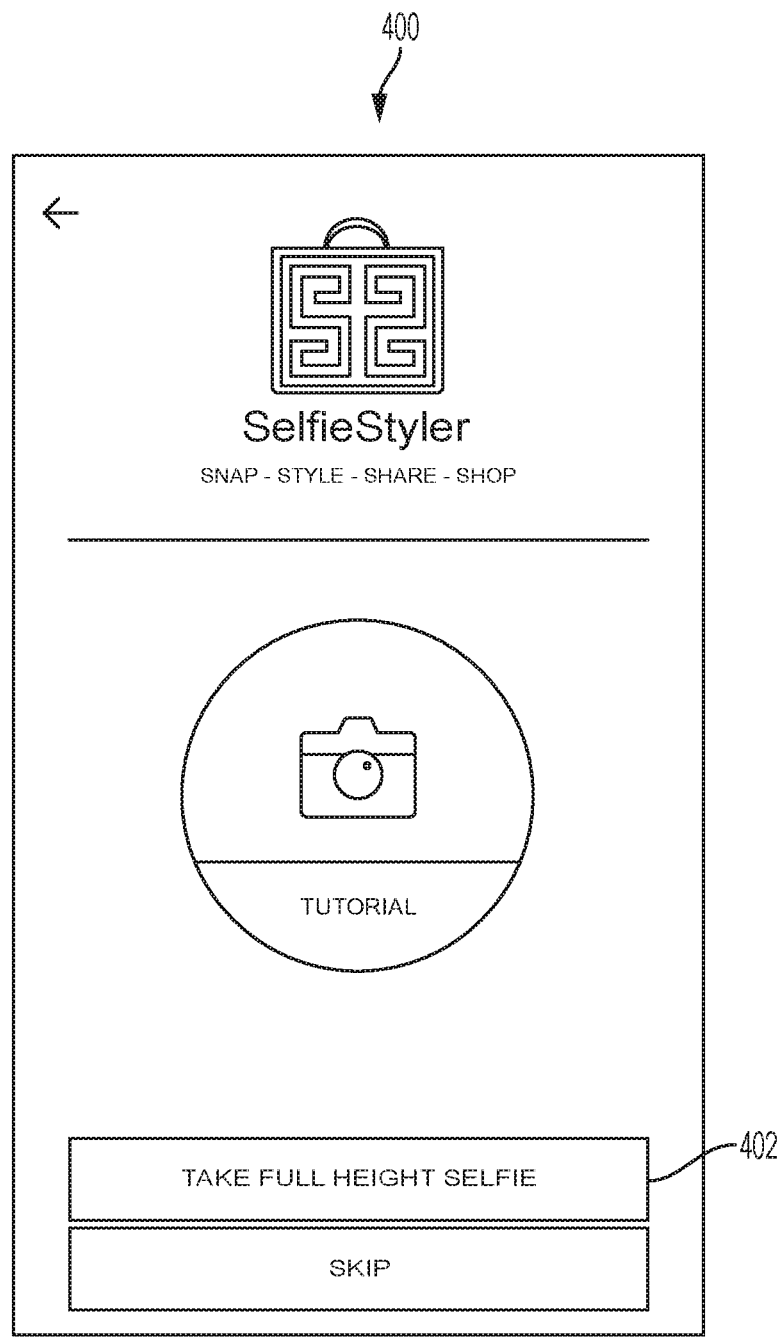
FIG. 4 is a screen shot of a GUI showing an example screen for a user to upload a photo of him or herself according some embodiments.

FIG. 4 is a screen shot of a GUI showing an example screen 400 for a user to upload a photo of him or herself according some embodiments. In operation the user activates button 402 to take a digital image (or perhaps to select a previously taken digital image) of the user for uploading to the virtual apparel fitting system. Some embodiments may use different mechanisms to launch a camera application to take a new digital image or to enable the user to upload a digital image of the user to the virtual apparel fitting system.

Figure 5:
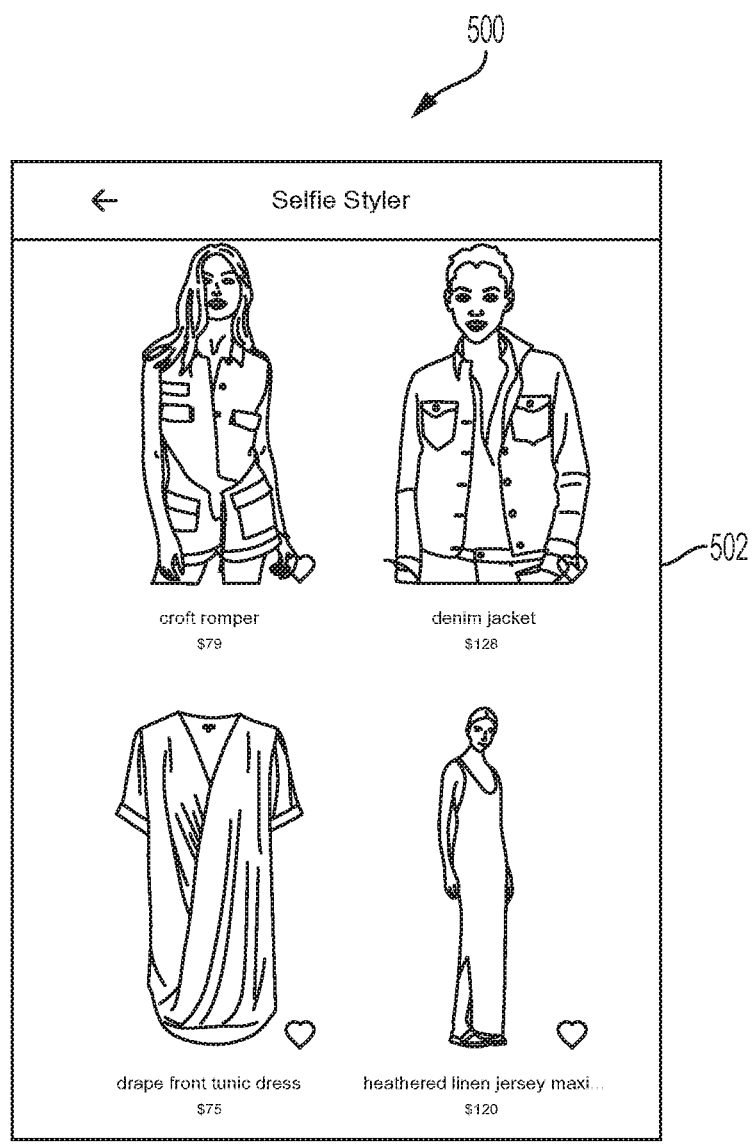
FIG. 5 is a screen shot of a GUI showing an example shopping page according some embodiments.

FIG. 5 is a screen shot of a GUI showing an example shopping page 500 according some embodiments. Shopping page 500 includes a set 502 of garments that a user can select to try on via the virtual apparel fitting system. In some embodiments, the shopping page 500 may display larger or smaller sets of garments on a single page.

Figure 6:
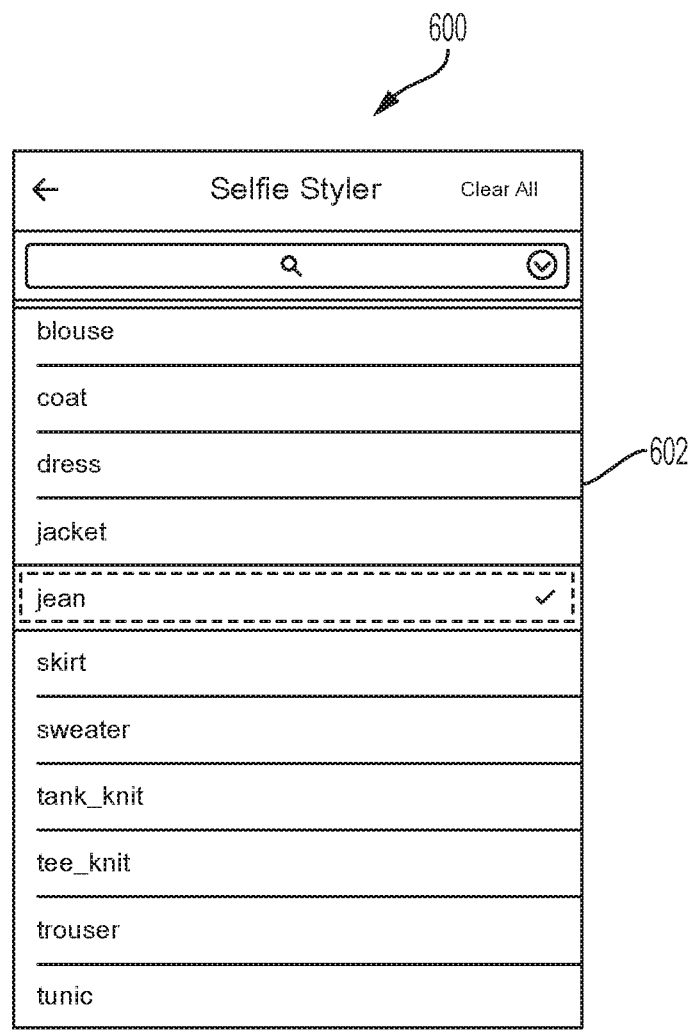
FIG. 6 is a screen shot of a GUI showing an example shopping page with a drop-down menu listing choices for shopping by style according to some embodiments.

FIG. 6 is a screen shot of a GUI showing an example shopping page 600 with a menu 602 listing choices for shopping by style according to some embodiments. Example shopping page 600 shows a menu 602 comprising different styles of clothes. Some embodiments may include menus that comprise more or fewer styles of clothes than the styles shown in drop-down menu 602.

Figure 7:
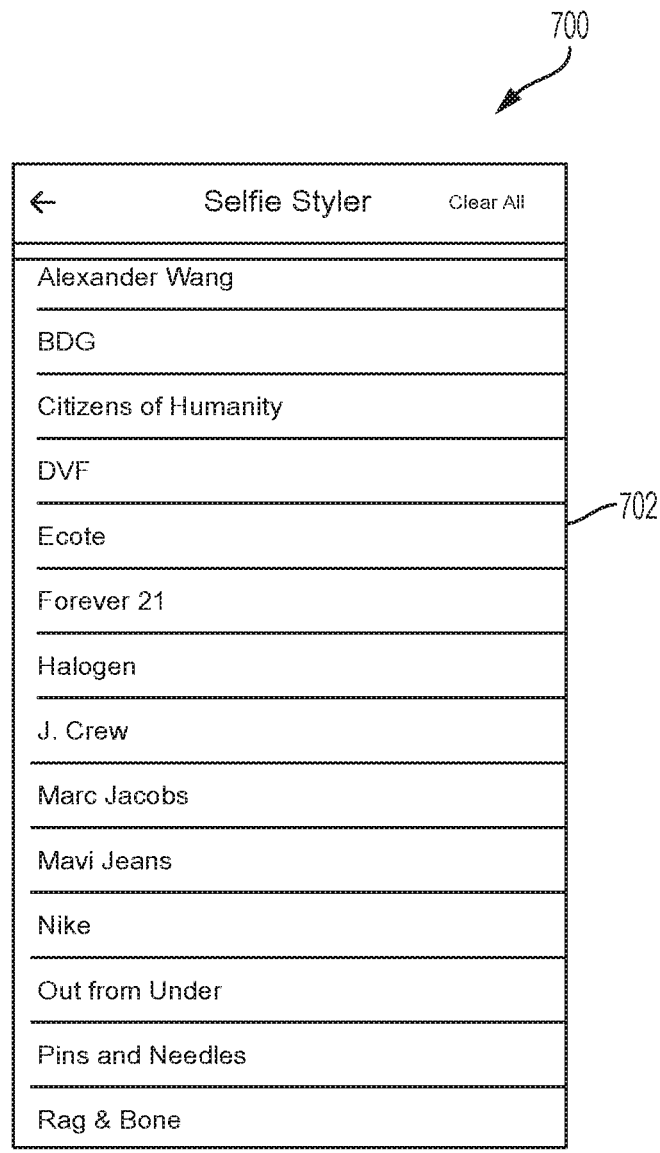
FIG. 7 is a screen shot of a GUI showing an example shopping page with a drop-down menu listing choices for shopping by brand according some embodiments.

FIG. 7 is a screen shot of a GUI showing an example shopping page 700 with a menu 702 listing choices for shopping by brand according some embodiments. Example shopping page 700 shows a menu 702 comprising different brands. Some embodiments may include menus that comprise more or fewer brands than the brands shown in menu 702.

Figure 8:
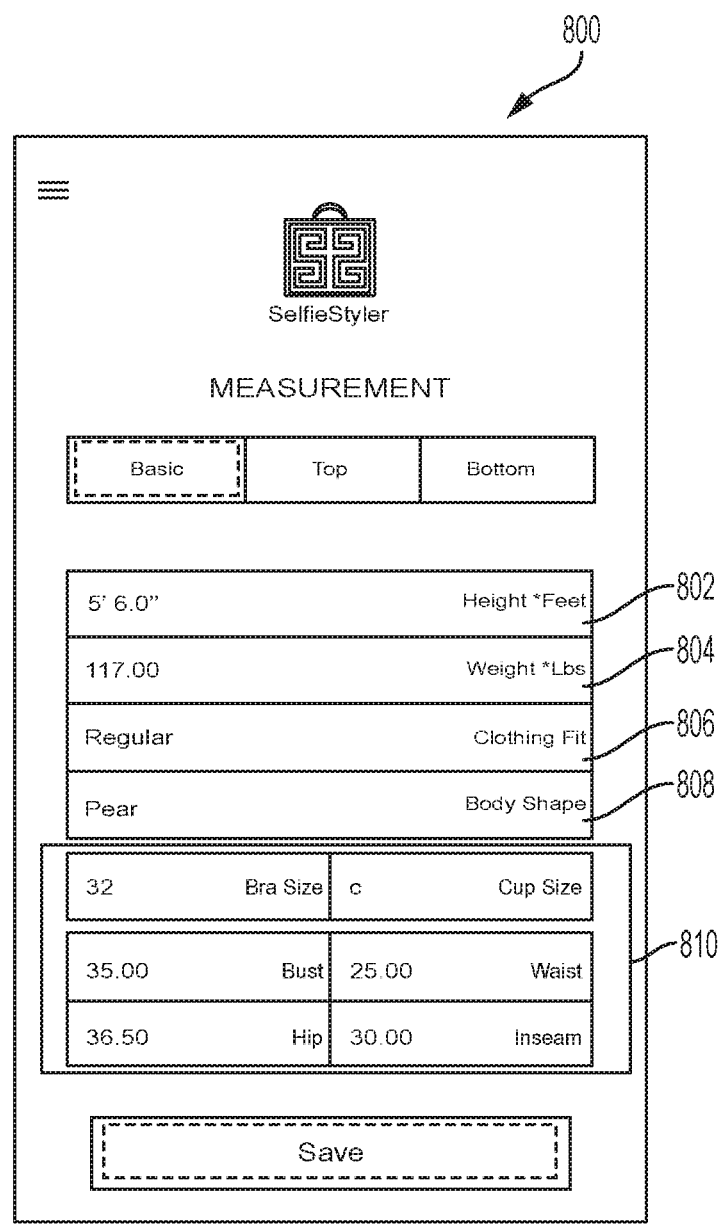
FIG. 8 is a screen shot of a GUI showing an example user profile screen that has specific measurements of the user according to some embodiments.

FIG. 8 is a screen shot of a GUI showing an example user profile screen 800 that shows specific measurements of the user according to some embodiments. Example user profile screen 800 includes body and measurement information for the user, including the user's height in field 802, the user's weight in field 804, the user's preferred clothing fit in field 806, and the user's body shape 808, along with other measurements in one or more additional fields 810. Some embodiments may have more or fewer body and measurement information than the body and measurement information shown in example user profile screen 800. For example, some embodiments may additionally or alternatively include the user's dress size, the user's inseam, the user's bust size, and/or perhaps other body and/or measurement information.

Figure 9:
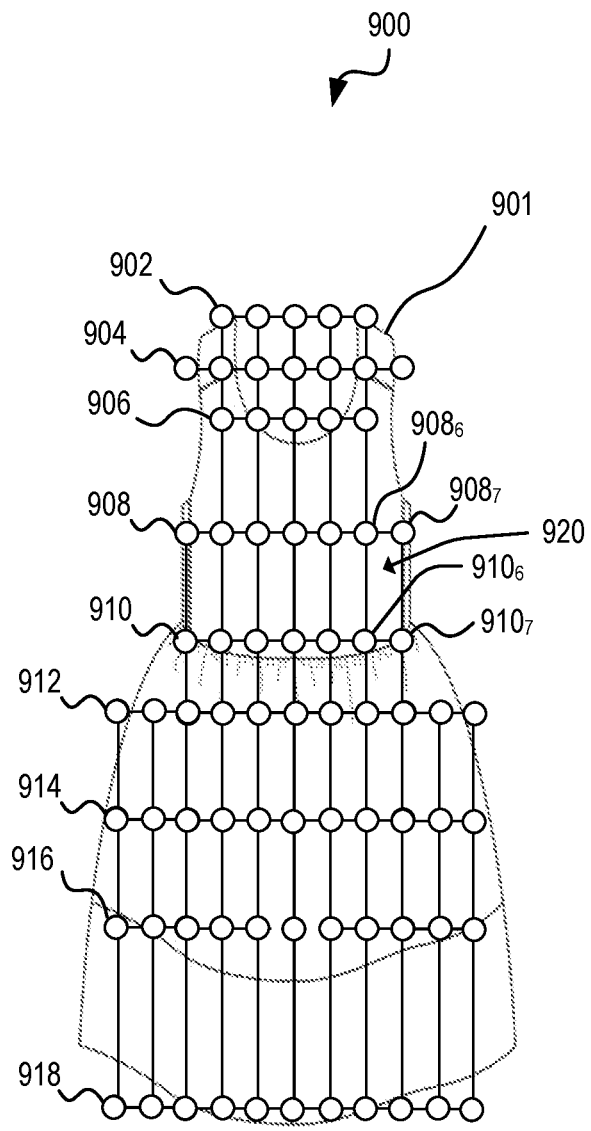
FIG. 9 is a diagram showing fit points in a garment image for use with some aspects of the disclosed embodiments.

FIG. 9 is a diagram showing fit points 902-918 in a garment image 900 of one size of a garment 901 for use with some aspects of the disclosed embodiments.

In some embodiments, the virtual apparel fitting system uses the above-described Photo-Grading Sub-Process (and/or variations thereof) to generate a plurality of garment images for a garment based on a single digital image of the garment, wherein each garment image corresponds to a different size of the garment. The plurality of garment images may include two-dimensional garment images and/or images of three-dimensional garment models, as described previously. Additionally, while the garment image 900 shows only the front of dress 901, additional garment images may show the side(s) and/or back of dress 901. In some embodiments, a server component of the virtual apparel fitting system generates the plurality of garment images for a particular garment.

For example, a typical garment such as dress 901 shown in FIG. 9 is available in a range of sizes, such as sizes 0, 2, 4, 6, 8, 10, 12, and perhaps other smaller or larger sizes. Some garments may also have additional designations, such as petite, tall, long, short, maternity or other additional designations. For example, in addition to sizes 0-12 the dress shown in FIG. 9 may also be available in 0-Petite, 2-Petite, and 4-Petite and perhaps other sizes with additional designations.

In some embodiments, the virtual apparel fitting system generates (or perhaps receives a garment image of a "reference" (or standard) size for a garment. In some embodiments, the virtual apparel fitting system uses the garment image for the reference size of the garment as a "reference garment age." In practice, generating the reference garment image includes (i) receiving a digital image of a mannequin wearing the "reference" size of the garment and (ii) removing the mannequin from the digital image, e.g., via a mask. The virtual apparel fitting system then uses the reference garment image to generate a garment image for each size of the garment based on a set of "fit points" for the garment and a set of "grade rules" for the garment.

A garment's grade rules are typically available from the manufacturer but could alternatively be obtained by physically measuring different sizes of the garment or determined from reference pattern grading text books or perhaps other sources. The grade rules describe the measurements of each size of the garment at a set of "fit points" for the garment. The fit points for example dress 901 in FIG. 9 include a set of five neck fit points 902, a set of seven shoulder fit points 904, a set of five upper chest fit points 906, a set of seven id-chest fit points 908, a set of seven waist fit points 910, a set of eleven hip fit points 912, a set of eleven thigh fit points 914, a set of eleven knee fit points 916, and a set of eleven calf fit points 918. Other garments may have more or fewer fit points arranged in the same or different areas. For example, a garment with sleeves shirt or blouse may have multiple fit points along the sleeve, bicep, elbow, forearm, and so on. Similarly, a shirt or blouse may not have fit points for the thigh, knee, or calf.

In operation, the virtual apparel fitting system preferably uses the garment's "grade rules" obtained from manufacturer to make smaller and/or larger garment images for smaller or larger sized versions of the garment based on the garment fit points. Making smaller and/or larger garment images from the "reference" garment image is sometimes referred to herein as "scaling" the "reference" garment image to the larger or smaller garment images. To use the example dress shown in FIG. 9, if the "reference garment image" is an image of a size 6 of dress 901, then the virtual apparel fitting system can use the manufacturer's grade rules and the fit points for dress 901 to convert the "reference garment image" of the size 6 of the dress 901 to a scaled image of any other size of the dress 901.

Mid-chest fit points $908_6$ and $908_7$ and waist fit points $910_6$ and $910_7$ illustrate one way that the virtual apparel fitting system uses the manufacturer grade rules and the fit points for dress 901 to generate scaled garment images for larger or smaller sizes of the dress 901 relative to the "reference garment image" of the size 6 of the dress 901. The manufacturer's grade rules for the dress 901 define, for every available size of the dress 901: (i) the distance between fit point $908_6$ and fit point $908_7$, (ii) the distance between fit point $908_7$ and fit point $910_7$, (iii) the distance between fit point $910_7$ and fit point $910_6$, and (iv) the distance between fit point $910_6$ and $908_6$. These four distance measurements define an area 920 bounded by fit points $908_6$, $908_7$, $910_7$, and $908_6$. The distances between fit points $908_6$, $908_7$, $910_7$, and $908_6$ are greater for larger sizes of the dress 901 and smaller for smaller s of the dress 901. Similarly, the corresponding area bounded by fit points $908_6$, $908_7$, $910_7$, and $908_6$ greater for larger sizes of the dress 901 and smaller for smaller sizes of the dress 901.

Using the "reference garment image" 900 of the size 6 "reference size" of dress 901, the fit points of the dress 901, and the manufacturer's grade rules for the dress 901, the virtual apparel fitting system determines a relationship between (i) a number of pixels between fit points $908_6$, $908_7$, $910_7$, and $908_6$ (and perhaps also a number of pixels in area 920 bounded by fit points $908_6$, $908_7$, $910_7$, and $908_6$ of dress 901) in the "reference garment image" 900 of the reference size 6 of the dress 901 and (ii) an mount of actual fabric between fit points $908_6$, $908_7$, $910_7$, and $908_6$ for the reference size 6 of the dress 901 (and perhaps also within area 920 hounded by fit points $908_6$, $908_7$, $910_7$, and $908_6$ of dress 901) according to the grade rules. After determining the relationship between the pixels in the reference garment image of the size 6 dress and the amount of fabric in the actual size 6 of the dress (based on the garment's grade rules), the virtual apparel fitting system can use that pixel-to-inch relationship to scale the "reference garment image" 900 up in size for larger sizes of the dress 901 (e.g., sizes 8, 10, 12, and so on) and/or scale the "reference garment image" 900 down in size for smaller sizes of the dress 901 (e.g., sizes 4, 2, 0, and so on).

As a simplified illustrative example, assume that the grade rules for the dress 901 state that, for a size 6 of the dress 901: (i) the distance between fit point $908_6$ and fit point $908_7$ is one inch, (ii) the distance between fit point $908_7$ and fit point $910_7$ is three inches, (iii) the distance between fit point $910_7$ and fit point $910_6$ is one inch and (iv) the distance between fit point $910_6$ and $908_6$ is three inches. In such an example, the area 920 bounded by fit points $908_6$, $908_7$, $910_7$, and $908_6$ in the size 6 of the dress 901 is three square inches.

Additionally, assume that an imaging analysis of the "reference garment image" 900 for the reference size 6 of the dress 901 shows) the distance between fit point $908_6$ and fit point $908_7$ is 100 pixels, the distance between fit point $908_7$ and fit point $910_7$ is 300 pixels, (iii) the distance between fit point $910_7$ and fit point $910_6$ is 100 pixels and (iv) the distance between fit point $910_6$ and $908_6$ is 300 pixels. In such an example, the area 920 hounded by fit points $908_6$, $908_7$, $910_7$, and $908_6$ in the reference garment image 900 of the dress 901 includes 30,000 pixels.

In this simplified illustrative example, the relationship between the amount of fabric in the reference size 6 of the dress 901 and the number of pixels in the reference garment image 900 of the size 6 of the dress 901 is 100 pixels to 1 inch (and 10,000 pixels per square inch). Of course in practice, an actual fabric-to-pixel ratio may be more or less than 100 pixels to 1 inch. Once the virtual apparel fitting system has determined the relationship between fabric to pixels with respect to the reference garment image, the virtual apparel fitting system can use this relationship to generate a separate garment image for size of the garment.

For example, further assume that the grade rules for the dress 901 further state that, for a size 8 of the dress 901: (i) the distance between fit point $908_6$ and fit point $908_7$ is 1.5 inches, (ii) the distance between fit point $908_7$ and fit point $910_7$ is 3.5 inches, (iii) the distance between fit point $910_7$ and fit point $910_6$ is 1.5 inches and (iv) the distance between fit point $910_6$ and $908_6$ is 3.5 inches. In such an example, the area 920 bounded by fit points $908_6$, $908_7$, $910_7$, and $908_6$ in the size 8 of the dress 901 is 5.25 square inches. Using the 100 pixels to 1 inch relationship determined above, the virtual apparel fitting system can generate a garment image for the size 8 of the dress 901 where: (i) the distance between fit point $908_6$ and fit point $908_7$ is 150 pixels, (ii) the distance between fit point $908_7$ and fit point $910_7$ is 350 pixels, the distance between fit point $910_7$ and fit point $910_6$ is 150 pixels and (iv) the distance between fit point $910_6$ and $908_6$ is 350 pixels. In such an example, the area 920 bounded by fit points $908_6$, $908_7$, $910_7$, and $908_6$ in the size 8 of the dress 901 is 52,500 pixels. In this manner, the generated garment image for a size 8 of the dress 901 has more pixels than the reference garment image 900 (size 6) in a manner proportional to how an actual size 8 of the dress 901 has more fabric than an actual size 6 of the dress 901.

In some embodiments, the virtual apparel fitting system may determine the fabric to pixel ratio/relationship in one area and then apply that ratio to the entire image in manner similar to that described above in the simplified illustrative example. In other embodiments, the virtual apparel fitting system may determine a fabric to pixel ratio between each adjacent fit point pair (e.g., $908_6$ to $908_7$ is one adjacent fit point pair, $908_7$ to $910_7$ is another adjacent fit point pair, and so on) and apply the determined fabric to pixel ratio between adjacent fit point pairs on a fit point pair by fit point pair basis when generating the garment image for a particular size of the garment.

In still further embodiments, the virtual apparel fitting system may divide the reference garment image into a plurality of "tiles" where an individual tile corresponds to an area bounded by a set of fit points. For example, area 920 bounded by fit points $908_6$, $908_7$, $910_7$, and $908_6$ may be considered one tile. The virtual apparel fitting system can use the determined fabric to pixel ratio to scale the size of individual tiles in the reference garment image up or down according to a determined ratio between fabric and pixels. In some embodiments the virtual apparel fitting system may determine a single fabric-to-pixel ratio and apply that single fabric-to-pixel ratio to the entire reference garment image according to the garment's grade rules to generate a garment image for each available size of the garment. In other embodiments, the virtual apparel fitting system may determine a fabric-to-pixel ratio for each tile on a tile-by-tile basis, and then apply each tile's corresponding fabric-to-pixel ratio to that tile according to the grade rules to generate different garment images for different sizes of the garment. Still further embodiments may include various combinations of the above-described methods (e.g., fit-point pair by fit-point pair, tile-by-tile, etc.) to generate a plurality of garment images for a garment based on a single digital image of the garment, wherein each garment image corresponds to a different size of the garment.

Those of skill art will understand that the fit points 902-918 are shown in FIG. 9 for illustration purposes only and need not be explicitly shown (and preferably are not explicitly shown) in the reference garment image for a garment or in any of the generated garment images for the different sizes of the garment.

As mentioned previously, in some embodiments, the virtual apparel fitting system additionally or alternatively generates a plurality of three-dimensional garment models, where each three-dimensional garment model corresponds to a particular size of the garment. The procedure for generating three-dimensional garment models is similar to the procedure for generating two-dimensional garment images described herein. For example, in some embodiments, the virtual apparel fitting system (i) receives a three-dimensional model of a mannequin wearing a reference size of the garment and (ii) generates a three-dimensional garment model for the reference size of the garment by removing the mannequin from the three-dimensional model of the mannequin wearing the reference size of the garment, wherein the three-dimensional reference model comprises a plurality of reference model regions. The virtual apparel fitting system may then use fit points in the three-dimensional reference model and the manufacturer's grade rules for the garment to determine one or more voxel-to-fabric ratios that can be used to generate three-dimensional garment models for any size of the garment in a manner similar to that described herein with reference to creating two-dimensional garment images. The virtual apparel fitting system may be further configured to generate images of the three-dimensional models for display to a user via a GUI as described herein.

FIG. 10 is a diagram showing fit points 1002-1024 in a user image 1000 of a user 1001 for use with some aspects of the disclosed embodiments.

In some embodiments, a user provides the virtual apparel fitting system with a digital photograph of him or herself, e.g., by taking a digital photograph and then uploading the photograph to the virtual apparel fitting system via screen 400 (FIG. 4). The virtual apparel fitting system may obtain a digital photograph of a user through alternative methods as well.

Some embodiments may additionally include applying a mask marker to the digital photograph of the user to determine the edges of the user's body in the digital photograph to obtain a user image. Alternatively, some embodiments may obtain a user image by (i) receiving (from the user) a calibration photo, where the calibration image includes a background, (ii) receiving (from the user) a photo of the user standing against the background, and (iii) extracting an image of the user from the photo of the user standing against the background by comparing the photo of the user standing against the background with the calibration photo of the background. In some embodiments, the virtual apparel fitting system can use the edges of the user's body in the user image to determine pixel length values between prospective user fit points in the user image in connection with (i) generating the user image 1000 comprising user fit points 1002-1020 and/or (ii) analyzing the user image 1000 in connection with aligning fit points in a garment image (for a particular size of the garment) with user fit points 1002-1024 in the user image 1000.

After receiving the digital photograph of the user, the virtual apparel fitting system may use one or more aspects of the above-described User Mapped Sub-Process (and/or variations thereof) and/or the above-described Preference Driven Sub-Process (and/or variations thereof) to generate the user image 1000 of the user 1001.

The user image 1000 of the user 1001 includes a plurality of fit points 1002-1024. The fit points for the example user image 1000 in FIG. 10 include a set of five neck fit points 1002, a set of nine shoulder fit points 1004, a set of nine upper chest fit points 1006, a set of seven mid-chest fit points 1008, a set of seven waist fit points 1010, a set of seven hip fit points 1012, a set of six thigh fit points 1014, a set of six knee fit points 1016, a set of six calf fit points 1018, a set of six ankle fit points 1020, a set of two elbow fit points, and a set of four wrist fit points 1024. Other user images may have more or fewer fit points arranged in the same or different areas.

In some embodiments, after receiving the digital photograph of the user, the virtual apparel fitting system (i) determines prospective user fit points (not shown) for the user 1001 in the digital photograph; (ii) aligns the prospective user fit points (not shown) with technical mannequin fit points (not shown) in an image of a technical mannequin (not shown); and (iii) shifts the prospective user fit points (not shown) in the digital photograph of the user 1001 to align the prospective user fit points with the technical mannequin fit points to generate the user fit points 1002-1024 in user image 1000 of user 1001. In this manner, the digital photo of the user is mapped onto an image of the technical mannequin in part by shifting prospective user fit points in the digital photo to align with corresponding mannequin fit points.

Rather than using a photograph of the user, some embodiments may alternatively use just a body mirroring avatar configured to substantially match the user's body shape, dimensions, weight, and height, as defined in the user's user profile (see, e.g., user profile screen 800 (FIG. 8)). In embodiments that use a body mirroring avatar, a photograph of the user is not required. Such embodiments may additionally include: (i) determining prospective user fit points for the user on the body mirroring avatar; (ii) aligning the prospective user fit points with technical mannequin fit points in a three-dimensional image of a technical mannequin; and (iii) shifting the user's prospective fit points to align with the technical mannequin fit points to generate a body mirroring avatar having user fit points that are aligned with the mannequin fit points.

Some embodiments may additionally or alternatively include mapping the digital photograph of the user onto a body mirroring avatar configured to substantially match the user's body shape, dimensions, weight, and height as defined in the user's user profile'see, e.g., user profile screen 800 (FIG. 8)). Such embodiments may additionally include: (i) determining prospective user fit points for the user on the body mirroring avatar; (ii) aligning the prospective user fit points with technical mannequin fit points in a three-dimensional model of a technical mannequin; and (iii) shifting the user's prospective fit points to align with the technical mannequin fit points to generate a body mirroring avatar having user fit points that are aligned with the mannequin fit points.

Figure 11:
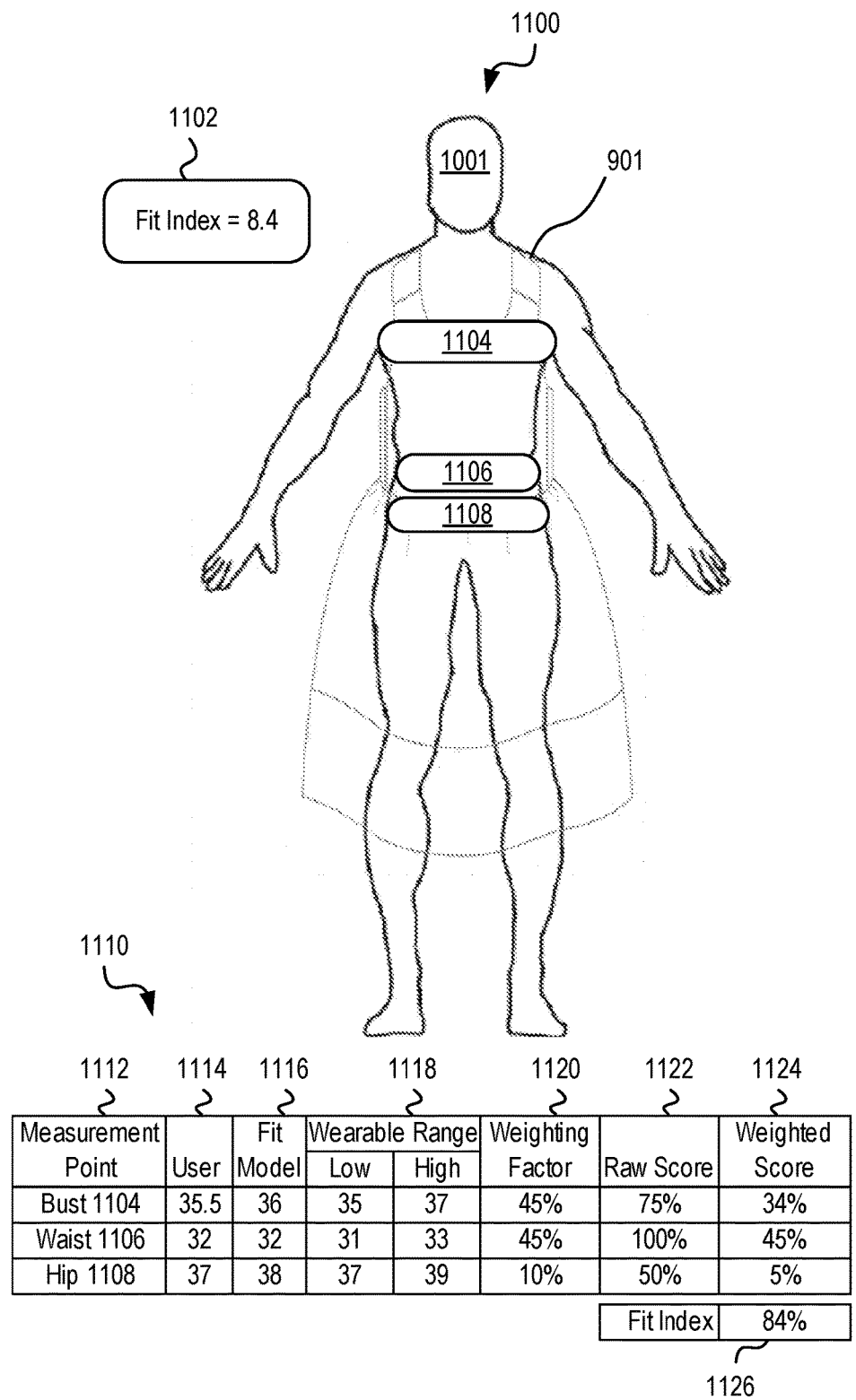
FIG. 11 shows an a of a user 1001 wearing a garment according to some embodiments.

FIG. 11 shows an example image 1100 of a user 1001 wearing a garment according to some embodiments. FIG. 11 also shows a fit index 1102 comprising a quantification of a degree to which the garment (dress 901) fits the user 1001.

In the example of FIG. 11, the image 1100 shows user 1001 wearing a size 8 of the dress 901. To generate the image 1100 of user 1001 wearing dress 901, the virtual apparel fitting system aligns the garment fit points 902-918 (FIG. 9) in the size 8 of the dress 901 with at least some of the user fit points 1002-1024 (FIG. 10) of the user 1001. Although example image 1100 is shown as a two-dimensional image in FIG. 11, other embodiments may include generating and displaying a three-dimensional image based at least in part on the methods for generating 3-D garment models and 3-D user models described herein.

FIG. 11 also shows a fit index 1102 for the garment (dress 901). In some embodiments, the fit index 1102 shows a quantitative value based at least in part on how closely one or more of the user's 1001 body measurement points match corresponding "key measurement points" in the garment. In some embodiments, the server system generates the fit index 1102 based at least in part on a difference between (i) a value of a measurement point of the user's body (which may be based on one or both of the user's actual measurements or an analysis of the user image 1000 (FIG. 10)) and (ii) a value of a corresponding key measurement point of a fit model for the garment.

For example the "key measurement points" for dress 901 may include bust measurement point 1104, waist measurement point 1106, and hip me point 1108. In operation, the key measurement points may vary from garment to garment depending on the garment. Preferably, the key measurement points for a particular garment are the most important measurement points that will have the greatest bearing on how well the garment will fit (or perhaps not fit) a user. For example, those of skill in the art would readily recognize that the chest, waist, and hip measurement points are more critical to the overall fit of dress 901 than, for example, measurement points for the thigh, knee, or ankle.

In some embodiments, generating the fit index includes defining a set of one or more weighting factors, wherein each weighting factor corresponds to a key measurement point for the garment. In some embodiments, for each key measurement point of the fit model for the garment, the server system (i) determines a difference between the value of the key measurement point for the fit model of the garment and the corresponding measurement point of the user, (ii) generates a raw score by dividing the determined difference by a wearable range for the measurement point of the fit model of the garment, and (iii) multiplies the raw score by the key measurement point's corresponding weighting factor to generate a weighted score for that key measurement point of the fit model for the garment for that particular user. Then, the server system generates a fit index for the garment for that user at least in part by summing the weighted scores for each measurement point of the fit model for the garment for that user.

Table 1110 in FIG. 11 shows one example of how the server system can determine a fit index for a particular garment (in a particular size) for a particular user based on (i) differences between user measurements and key measurement points for the garment manufacturer's fit model (ii) a wearable range for each key measurement point, and (iii) weighting factors for each key measurement point.

Table 1110 shows the set of key measurement points 1112 for garment 901, which includes bust measurement point 1104, waist measurement point 1106, and hip measurement point 1108.

Table 1110 also shows values for the user's 1001 body measurements 1114 at the three key measurement points for the garment 901. The user's body measurements 1114 may be stored in a profile for the user 1001. In operation, the user's 1001 body measurements in her profile may be determined from one or more of (i) actual body measurements input by the user 1001 when registering with the system (e.g., FIGS. 3, 8), and/or (ii) an analysis of the user's 1001 body image 1000 (FIG. 10). In this example, the user's 1001 body measurements 1114 at the three key measurement points for garment 901 are (i) 35.5 inches in the bust, (ii) 32 inches in the waist, and (iii) 36 inches in the hips.

Table 1110 also shows values for the key measurement points of the fit model for this particular size of the garment (i.e., dress 901). As mentioned previously, the manufacturer's fit model reflects the manufacturer's "ideal" measurements for this particular size of the garment. In this example, the values for the key measurement points for the manufacturer's fit model of this particular size of the garment are (i) 36 inches in the bust, (ii) 32 inches in the waist, and (iii) 38 inches in the hips.

Table 1110 also shows a wearable range 1118 for each key measurement point for this particular size of dress 901. In some embodiments, the wearable range for each key measurement point for the manufacturer's fit model may be based on one or more of (i) a wearable range defined by the manufacturer, a wearable range determined by the server system, e.g., based on the manufacturer's grade rules, textbooks, or other guides, and/or (iii) a wearable range assigned by an operator of the server system. In some embodiments, the wearable range may be additionally or alternatively based at least in part on the type of fabric (e.g., stretchiness or stiffness) whether the garment is intended to be worn with other garments as a base layer or an outer layer, the drape or lie of the fabric, and/or perhaps other qualitative characteristics. In this example, the wearable range 1118 for each key measurement point is based on a 2 inch "grade rule" specified by the garment manufacturer. As a result, for each key measurement point, the low end of the wearable range is 1 inch less than the fit model's "ideal" and the high end of the wearable range 1 inch greater than the fit model's "ideal" size the value of the wearable range is (i) from 35 inches to 37 inches in the bust, (ii) from 31 inches to 33 inches in the waist, and (iii) from 37 inches to 39 inches in the hips.

In some embodiments, the server system may be configured to inform the user that a particular size of a particular garment does not fit the user if any one of the user body measurements 1114 for the key measurement points for that size of the garment are outside of the wearable range 1118 for any one of the key measurement points for that size of the garment. For instance if the example shown in FIG. 11 corresponds to a size 6 dress, and if user's actual hip measurement exceeded 39 inches, then if the user tried to select a size 6 dress, the system may suggest that the user select a size 8 dress instead of the size 6 because the user's body measurement for one of the key measurement points falls outside the wearable range. Similarly, if the user's actual measurement was below the wearable range for a particular key measurement then may suggest that the user select a smaller size.

Table 1110 also shows a weighting factor 1120 for each key measurement point for this particular size of dress 901. In some embodiments, the weighting factor for each key measurement point for the manufacturer's fit model may be based on one or more of (i) a weighting factor defined by the manufacturer, (ii) a weighting factor determined by the server system, e.g., based on the manufacturer's grade rules, textbooks, or other guides and/or (iii) a weighting factor assigned by an operator of the server system. In some embodiments, a weighting factor may be based on a qualitative assessment of the most important measurement points for the garment, i.e., those measurement points that have the greatest impact on how well (or not) a particular garment will fit a user. In this example, the weighting factor is (i) 45° for the bust, (ii) 45% for the waist, and (iii) 10% for the hip because, based on the style of dress 901, which is designed to be tighter through the bust and waist but looser in the hips, the bust measurement point 1104 and waist measurement point 1106 are more important than the hip measurement point 1108 when determining how well (or not well) dress 901 will fit a particular user, such as user 1001.

In operation, for each measurement point, the system (i) determines a difference between the user's measurement and the fit model, (ii) generates a raw score by dividing the determined difference by the wearable range, and (iii) multiplies the raw score by a weighting factor to generate a weighted score for that measurement point. For example, for the bust measurement point 1104, the system (i) determines that the difference between the user's bust measurement of 35.5 inches and the fit model's bust measurement of 36 inches is 0.5 inches, (ii) divides the 0.5 inch difference by the wearable range of 2 inches to generate a raw score of 75% (e.g., 1-0.5/2), and (iii) multiplies the raw score of 75% by the weighting factor of 45% to generate a weighted score of 34%. Similarly, for the waist measurement point 1106, the system (i) determines that the difference between the user's waist measurement of 32 inches and the fit model's waist measurement of 32 inches is 0 inches, (ii) divides the 0 inch difference by the wearable range of 2 inches to generate a raw score of 100% (e.g., 1-0/2), and (iii) multiplies the raw score of 100% by the weighting factor of 45% to generate a weighted score of 45%. Finally, for the hip measurement point 1108, the system (i) determines that the difference between the user's hip measurement of 37 inches and the fit model's hip measurement of 38 inches is 1 inch, (ii) divides the 1 inch difference by the wearable range of 2 inches to generate a raw score of 50% (e.g., 1-½), and (iii) multiplies the raw score of 50% by the weighting factor of 10% to generate a weighted score of 5%.

Then, the system sums the weighted scores for each of the three measurement points to obtain the fit index, i.e., 34%+45%+5%=84%. In some embodiments, the system may additionally divide the calculated index by 10 to generate a value for the fit index of 1 to 10. In the example shown in FIG. 11, block 1102 shows a fit index of 8.4.

The above-described example is only one of many ways of calculating a fit index based at least in part on a difference between at least one value of a measurement point of the user and a value of a corresponding measurement point of a fit model for the garment. For example, rather than calculating a raw score based on the actual wearable range as in the above-described example, some embodiments may instead calculate the raw score based on a range that extends beyond the wearable range, by a fixed amount or perhaps by a multiple of the manufacturer's grade rule. For example, in some embodiments, the wearable range at each measurement point within a broader calculation range for the measurement point, and such embodiments may use the calculation range rather than the wearable range to generate raw scores at each measurement point that are then used in calculating a fit index for a particular size of a garment.

In another example, the system may use a 5 inch calculation range corresponding to 2.5 times the 2 inch grade rule. The calculation range could alternatively correspond to other multiples of the grade rule. The calculation range could also be some value independent of the grade rule, such as some fixed range that is greater than the wearable range. In this example, for each measurement point, the system (i) determines a difference between the user's measurement and the fit model, (ii) generates a raw score by dividing the determined difference by the 5 inch calculation range (which is broader than the wearable range), and (iii) multiplies the raw score by a weighting factor to generate a weighted score for that measurement point. For example, for the bust measurement point 1104, the system (i) determines that the difference between the user's bust measurement of 35.5 inches and the fit model's bust measurement of 36 inches is 0.5 inches, (ii) divides the 0.5 inch difference by the calculation range of 5 inches to generate a raw score of 90% (e.g., 1-0.5/5), and (iii) multiplies the raw score of 90% by the weighting factor of 45% to generate a weighted score of 40.5%. Similarly, for the waist measurement point 1106, the system (i) determines that the difference between the user waist measurement of 32 inches and the fit model's waist measurement of 32 inches is 0 inches, (ii) divides the 0 inch difference by the calculation range of 5 inches to generate a raw score of 100% (e.g., 1-0/5), and (iii) multiplies the raw score of 100% by the weighting factor of 45% to generate a weighted score of 45%. Finally, for the hip measurement point 1108, the system (i) determines that the difference between the user's hip measurement of 37 inches and the fit model's hip measurement of 38 inches is 1 inch, (ii) divides the 1 inch difference by the calculation range of 5 inches to generate a raw score of 80% (e.g., 1-1/5), and (iii) multiplies the a score of 90% by the weighting factor of 10% to generate a weighted score of 8.0%.

Then the system sums the weighted scores for each of the three measurement points to obtain the fit index, i.e., 40.5%+45%+8%=93.5%. In some embodiments, the system may additionally divide the calculated index by 10 to generate a value for the fit index of 1 to 10, which would be 9.4 in this example.

In still further embodiments, rather than calculating a raw score the server system may instead lookup a raw score in a pre-configured table for the garment. In one such embodiment, for an individual measurement point, the server may (i) assign a raw score of 100% of the difference between the user measurement and the fit model measurement at the key measurement point is 0 (i.e., the user measurement=the fit model measurement), (ii) assign a raw score of 95% if the difference is less than 0.25 inches, (iii) assign a raw score of 90% if the difference is between 0.25 inches and 0.5 inches, (iv) assign a raw score of 85% if the difference is between 0.5 inches and 0.75 inches, (v) assign a raw score of 80% if the difference is between 0.75 inches and 1 inches, and so on. In operation, different garments may implement different lookup tables with different raw scores (e.g., 100%, 95%, 90%, etc.) corresponding to various difference values (0 inches, 0.25 inches, 0.25 to 0.5 inches, etc.).

Some embodiments may additionally adjust certain values for the fit model of a particular garment (or garments, or type of garments, or style of garments, for example) based on user fit preferences. In operation the system may be configured to shift one or more values for one or more measurement points of the fit model up or down by 0.5 inches or perhaps 1.0 inches or even 1.5 inches depending on how loose or tight) the user prefers the fit as well as the measurement point (e.g., the user may prefer a looser fit in the hips than in the arms). Rather than shifting one or more values for one or more measurements points of the fit model up or down by a specific amount, some embodiments may instead shift one or more values for one or more measurement points of the fit model up or down by some percentage (e.g., up or down by 5% or 10% or some other value). For example, if user 1001 prefers a looser-than-standard fit through the bust in dresses, then the system may adjust the value of the bust measurement point 1104 for dress 901 (and perhaps for all dresses, or perhaps at least for all similarly-styled dresses) by 0.5 inches to account for the user'specific fit preference. In this example, the system will decrease the bust measurement of the ideal model from 36 inches down to 35.5 inches (and also possibly shift the wearable range or perhaps the calculation range, if applicable). By shifting the bust measurement of the ideal model from 36 inches down to 35.5 inches, the system will calculate a raw score of 100% for the bust measurement point 1104 rather than 75%, which will result in an overall higher fit index. Even though the user's body is actually 0.5 inches smaller than the manufacturer's fit model (the "ideal fit"), the system generates a higher fit index for this particular user by using this particular user's looser-than-standard fit preference than the system would have otherwise calculated had the system not adjusted the fit model to account for the user's fit preference. In this manner, the system can generate a fit index for a user that is based at least in part on the user's own personal fit preference.

Regardless of the method used to determine the raw scores, the system may still determine the fit index in any of the ways described herein and then provide the fit index to the user's computing device for display to the user within a graphical user interface.

Figure 12:
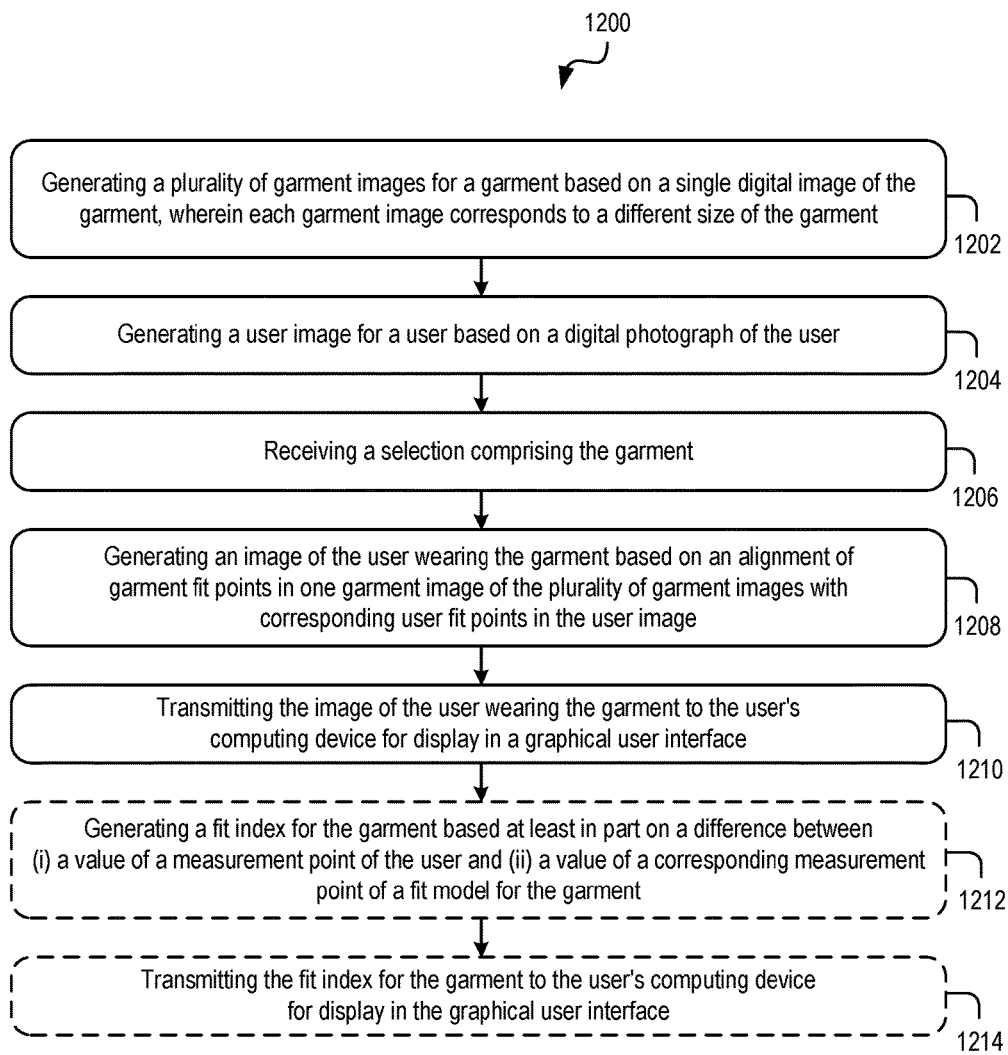
FIG. 12 is a flow chart of a method according to some embodiments.

FIG. 12 is a flow chart of a method 1200 according to some embodiments, including but not limited to any of the embodiments disclosed and/or described herein. In some embodiments, the virtual apparel fitting system comprises one or more servers (or other networked computing devices) configured to execute one or more steps of method 1200. In some embodiments, method 1200 is implemented in the form of computer-readable instructions stored on tangible, non-transitory computer readable media, wherein the instructions, when executed by one or more processors of the one or more servers of the virtual apparel fitting systems causes the one or more servers of the virtual apparel fitting to perform one or more aspects of method 1200 and/or variations thereof.

In some embodiments, the virtual apparel fitting system may additionally comprise a user's computing device or client device (e.g., a smartphone, tablet computer, laptop and other computing device), where the user's computing device configured to execute one or more steps of method 1200. In such embodiments, method 1200 is implemented in the form of computer-readable instructions stored on tangible, non-transitory computer-readable media, wherein the instructions, when executed by one or more processors of the user's computing device (or client device) causes the user's computing device to perform one or more aspects of method 1200 and/or variations thereof.

Method 1200 begins at block 1202, which includes generating a plurality of garment images for a garment based on a single digital image of the garment, wherein each garment image corresponds to a different size of the garment.

In some embodiments, the step of generating a plurality of garment images for a garment based on a single digital image of the garment at block 1202 may include one or more of (i) receiving a digital image of a mannequin wearing a reference size of the garment; (ii) generating a reference image for the reference size of the garment by removing the mannequin from the digital image of the mannequin wearing the reference size of the garment, wherein the reference image comprises a plurality of reference image regions; (iii) generating a first garment image for a first size of the garment, wherein the first size is smaller than the reference size, wherein generating the first garment image comprises shrinking the reference image in each reference image region by an amount corresponding to a difference between (a) an amount of fabric within each of a plurality of physical regions of the reference size of the garment, wherein each physical region of the reference size of the garment corresponds to a reference image region in the reference image and (b) an amount of fabric within each of a plurality of physical regions of the first size of the garment, wherein each physical region of the first size of the garment corresponds to a reference image region in the reference image; and/or (iv) generating a second garment image for a second size of the garment, wherein the second size is larger than the reference size, wherein generating the second garment image comprises expanding the reference image in each reference image region by an amount corresponding to a difference between (a) an amount of fabric within each of a plurality of physical regions of the reference size of the garment, wherein each physical region of the reference size of the garment corresponds to a reference image region in the reference image and (b) an amount of fabric within each of a plurality of physical regions of the second size of the garment, wherein each physical region of the second size of the garment corresponds to a reference image region in the reference image.

In some embodiments, block 1202 may additionally or alternatively include generating a three-dimensional model of the user wearing the garment based on an alignment of garment fit points in one three-dimensional garment model from a plurality of three-dimensional garment models. In such embodiments, block 1202 may include one or more of: (i) receiving a three-dimensional mannequin model of a mannequin wearing a reference size of the garment; (ii) generating a three-dimensional reference garment model for the reference size of the garment by removing the mannequin from the three-dimensional model of the mannequin wearing the reference size of the garment, wherein the three-dimensional reference garment model comprises a plurality of reference garment model regions; (iii) generating a first three-dimensional garment model for a first of the garment, wherein the first size is smaller than the reference size, wherein generating the first three-dimensional garment model comprises shrinking the three-dimensional reference garment model in each reference garment model region by an amount corresponding to a difference between (a) an amount of fabric within each of a plurality of physical regions of the reference size of the garment, wherein each physical region of the reference size of the garment corresponds to a reference garment model region in the three-dimensional reference garment model and b) an amount of fabric within each of a plurality of physical regions of the first size of the garment, wherein each physical region of the first size of the garment corresponds to a reference garment model region in the three-dimensional reference garment model; and/or (iv) generating a second three-dimensional garment model for a second size of the garment, wherein the second size is larger than the reference size, wherein generating the second three-dimensional garment model comprises expanding the three-dimensional reference garment model in each reference garment model region by an amount corresponding to a difference between (a) an amount of fabric within each of a plurality of physical regions of the reference size of the garment, wherein each physical region of the reference size of the garment corresponds to a reference garment model region in the three-dimensional reference garment model and (b) an amount of fabric within each of a plurality of physical regions of the second size of the garment, wherein each physical region of the second size of the garment corresponds to a reference garment model region in the three-dimensional reference garment model.

Method 1200 also includes block 1204, which comprises generating a user image for a user based on a digital photograph of the user.

In some embodiments, the step of generating the user image for the user based on the digital photograph of the user in block 1204 includes one or more of: (i) receiving the digital photograph of the user; (ii) determining prospective user fit points for the user; (iii) aligning the prospective user fit points with technical mannequin fit points in an image of a technical mannequin; and/or (iv) shifting the prospective user fit points in the digital photograph of the user to align with the technical mannequin fit points.

In some embodiments, the step of generating the user image for the user based on the digital photograph of the user in block 1204 may additionally or alternatively include one or more of: (i) receiving a calibration image from the user, wherein the calibration image comprises a background; (ii) receiving the digital photograph of the user, wherein the digital photograph of the user comprises an image of the user standing in front of the background, (iii) extracting an image of the user from the digital photograph of the user based on a comparison of the digital photograph with the calibration image; (iv) determining prospective user fit points for the user in the image of the user; (v) aligning the prospective user fit points with technical mannequin fit points in an image of a technical mannequin; and/or (vi) shifting the prospective user fit points in the image of the user to align with the technical mannequin fit points.

In some embodiments, the step of generating the user image for the user based on the digital photograph of the user in block 1204 may additionally or alternatively include one or more of: (i) receiving one or more digital photographs of the user; (ii) mapping the digital photograph(s) of the user onto a 3-D body model of the user configured to substantially match a body shape, dimension, weight, and/or height of the user; (iii) determining user fit points for the user on the 3-D body model; (iv) aligning the user fit points with technical mannequin fit points in a three-dimensional model of a technical mannequin; and/or (v) shifting the user's fit points to align with the technical mannequin fit points. However, some embodiments may use a body mirroring avatar or a 3-D body model without a digital photograph of the user (and without using a digital photograph of the user). In such embodiments, generating a user image of the user may instead include (i) receiving and/or generating a 3-D body model configured to substantially match a body shape, dimension, weight, and/or height of the user, (ii) determining user fit points for the user on the 3-D body model, (iii) aligning the user fit points with technical mannequin fit points in a three-dimensional model of a technical mannequin; and/or (iv) shifting the user's fit points to align with the technical mannequin fit points.

Method 1200 also includes block 1206, which comprises receiving a selection comprising the garment. In some embodiments, the step of receiving a selection comprising the garment comprises receiving one or more of: (i) an identification of the garment and/or (ii) an identification of a size of the garment.

Method 1200 also includes block 1208, which comprises in response to receiving the selection comprising the garment, generating an image of the user wearing the garment based at least in part on an alignment of garment fit points in one garment image of the plurality of garment images with corresponding user fit points in the user image.

In some embodiments, the step of generating an image of the user wearing the garment based on an alignment of garment fit points in one garment image of the plurality of garment images with corresponding user fit points in the user image in block 1208 includes generating a two-dimensional image of the user wearing the garment based on an alignment of garment fit points in one two-dimensional garment image of the plurality of garment images with corresponding user fir points in a two-dimensional user image. In some embodiments the step of generating an image of the user wearing the garment based on an alignment of garment fit points in one garment image of the plurality of garment images with corresponding user fit points in the user image in block 1208 may additionally or alternatively include generating one or more images of a three-dimensional model of the user wearing the garment based on an alignment of garment fit points in one three-dimensional garment model of the plurality of garment models with corresponding user fit points in a three-dimensional user model.

Method 1200 also includes block 1210, which includes transmitting the image of the user wearing the garment to the user's computing device for display in a graphical user interface. In some embodiments, the image of the user wearing the garment transmitted to the user's computing device may include one or both of (i) a two-dimensional image of the user wearing the garment and/or (ii) one or more images of a three-dimensional model of the user wearing the garment.

In some embodiments, the step of transmitting the image of the user wearing the garment to the user's computing device for display in a graphical user interface at block 1210 may additionally include displaying the image of the user wearing the garment in the graphical user interface.

Some embodiments of method 1200 may also include optional block 1212, which includes generating a fit index for the garment based at least in part on a difference between (i) a value of a measurement point of the user and (ii) a value of a corresponding measurement point of a fit model for the garment.

In some embodiments, the fit model for the garment comprises a plurality of measurement points and the step of generating a fit index for the garment based at least in part on a difference between a value of a measurement point of the user and a value of a corresponding measurement point of the fit model for the garment in block 1212 comprises: (1) for each measurement point of the fit model for the garment, (i) determining a difference between the measurement point of the user and the corresponding measurement point of the fit model for the garment, (ii) generating a raw score by dividing the determined difference by a measurement range (e.g., a wearable range or a calculation range, as described herein) for the measurement point of the fit model for the garment, wherein the measurement range is based at least in part on a grade rule for the garment, and (iii) multiplying the raw score by a weighting factor to generate a weighted score for the measurement point of the fit model for the garment; and (2) generating a fit index for the garment at least in part by summing the weighted scores for each measurement point of the fit model for the garment.

In other embodiments, the fit model for the garment comprises a plurality of measurement points, and the step of generating a fit index for the garment based at least in part on a difference between a value of a measurement point of the user and a value of a corresponding measurement point of the fit model for the garment in block 1212 comprises: (1) for each measurement point of the fit model for the garment, (i) determining a difference between the measurement point of the user and the corresponding measurement point of the fit model for the garment, (ii) based on the determined difference, assigning a raw score for the measurement point of the fit model for the garment from a table, and (iii) multiplying the raw score by a weighting factor to generate a weighted score for the measurement point of the fit model for the garment; and (2) generating a fit index for the garment at least in part by summing the weighted scores for each measurement point of the fit model for the garment. In some embodiments, values in the table may be based at least in part on any one or more of (i) a grade rule for the garment, (ii) a textbook or other design guide, (iii) or a qualitative determination made by an operator of the virtual fitting system.

In still further embodiments, the fit model for the garment comprises a plurality of measurement points, and the step of generating a fit index for the garment based at least in part on a difference between a value of a measurement point of the user and a value of a corresponding measurement point of the fit model for the garment in block 1212 comprises: (1) for each measurement point of the fit model for the garment, (i) adjusting the measurement point of the fit model for the garment based on one or more user fit preferences, (ii) determining a difference between the measurement point of the user and the adjusted measurement point of the fit model for the garment, (iii) generating a raw score by dividing the determined difference by a wearable range for the measurement point of the fit model for the garment, wherein the wearable range is based at least in part on a grade rule for the garment, and (iv) multiplying the raw score by a weighting factor to generate a weighted score for the measurement point of the fit model for the garment; and (2) generating a fit index for the garment at least in part by summing the weighted scores for each measurement point of the fit model for the garment. In some embodiments, the user fit preferences may include whether and/or the degree to which the user prefers a looser-than-standard fit, tighter-than-standard fit, or other deviation from standard fit, where the "standard fit" is based on the manufacturer's fit model.

In still further embodiments, the fit model for the garment comprises a plurality of measurement points, and the step of generating a fit index for the garment based at least in part on a difference between a value of a measurement point of the user and a value of a corresponding measurement point of the fit model for the garment in block 1212 comprises: (1) for each measurement point of the fit model for the garment, (i) adjusting the measurement point of the fit model for the garment based on one or more user fit preferences, (ii) determining a difference bet en the measurement point of the user and the adjusted measurement point of the fit model for the garment; (iii) based on the determined difference, assigning a raw score for the measurement point of the fit model for the garment from a table based at least in part on a grade rule for the garment, and (iv) multiplying the raw score by a weighting factor to generate a weighted score for the measurement point of the fit model for the garment; and (2) generating a fit index for the garment at least in part by summing the weighted scores for each measurement point of the fit model for the garment. In some embodiments, the user fit preferences may include whether and/or the degree to which the user prefers a looser-than-standard fit, tighter-than-standard fit, or other deviation from standard fit, where the "standard fit" is based on the manufacturer's fit model.

In operation, adjusting (e.g., increasing or decreasing) the value for a measurement point for the fit model based on a user fit preference will change the outcome of the fit index analysis described herein by, for a user with a preference for a looser-than-standard fit, for example, calculating a higher (better) fit index for a looser-than-standard fit and a lower (worse) fit index for a standard fit according to the manufacturer's fit model so that the calculated fit index reflects the user's actual fit preference.

Some embodiments of method 1200 may also include optional block which includes transmitting the fit index for the garment determined in block 1212 to the user's computing device for display in the graphical user interface. In some embodiments, the step of transmitting the fit index to the user's computing device for display in the graphical user interface at block 1214 may additionally include displaying the fit index in the graphical user interface.

Figure 13:
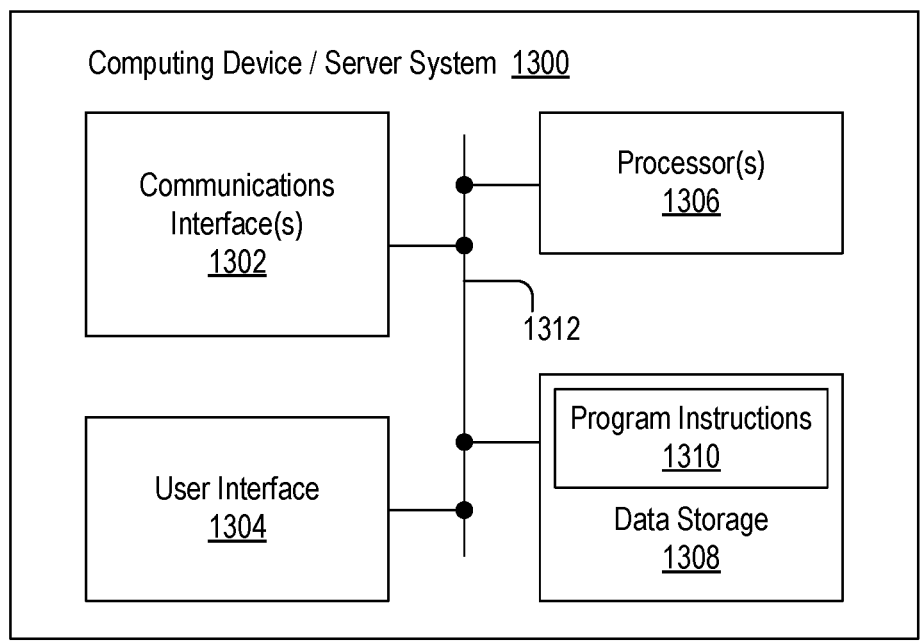
FIG. 13 is a high level block diagram of a computing system configured for use with some embodiments.

FIG. 13 is a high level block diagram of a computing device 1300 configured for use with some embodiments. In some embodiments, computing device 1300 corresponds to a server (or perhaps server system) such as a web server or other networked computing device of the virtual apparel fitting system. In some embodiments, computing device 1300 may additionally correspond to a user's computing device, e.g., a smartphone, tablet computer, laptop, or other type of computing device.

Computing device 1300 includes one or more processors 1306 data storage 1308 comprising instructions 1310 one or more communication interface(s) 1302, and one or more user interface(s) 1304, all of which are communicatively coupled to a system bus 1312 or similar structure or mechanism that enables the identified components to function together as needed to perform any of the methods and functions described herein. Variations from this arrangement are possible as well, including addition and/or omission of components, combination of components, and distribution of components in any of a variety of ways.

The one or more processors 1306 include one or more general purpose processors (e.g., microprocessors) and/or special purpose processors (e.g., application specific integrated circuits (ASICs), digital signal processors (DSP), or other processors). In some embodiments, the one or more processors 1306 may be integrated in whole or in part with one or more of the other components of the computing device 1306.

The communication interface(s) 1302 includes components (e.g., radios, antennas, communications processors, wired interfaces) that can be configured to engage in communication with one or more other computing devices. For example, the communication interface(s) 1302 may include one or more antenna structures and chipsets arranged to support wireless communication (e.g., WiFi, Bluetooth, etc.) and/or wired interfaces (e.g., serial, parallel, universal serial bus (USB), Ethernet, optical, etc.). In operation, one or more of the communication interface(s) 1302 of the computing device 1300 are configured to communicate with, for example, one or more communication interface(s) of another computing device (e.g., one or more servers or other computing devices) to accomplish a variety of functions, including but not limited to performing one or more steps or aspects of any of embodiments of the virtual apparel fitting systems and processes disclosed and described herein. For example, in some embodiments, a server system in the virtual apparel fitting system may receive images and other data from a user's computing device, process the received images and other data according to any of the methods, processes, and/or sub-processes disclosed and described herein, and transmit one or more images (e.g., garment images, user images, images of the user wearing a garment, and/or other images) and/or other information (e.g., fit index values and/or other information) back to the user's computing device for display to the user.

The input/output interface(s) 1304 may include any one or more of a keyboard, touchscreen, touchpad, screen or display, or other input/output interfaces now known or later developed. In some embodiments, the input/output interface (s) 1304 comprises a display with a graphical user interface configured to display any or all of the (i) the user interface screens shown and described with reference to FIGS. 1-8, (ii) two-dimensional and/or three-dimensional user images and garment images, (iii) two-dimensional and/or three-dimensional images of users wearing garments, and/or (iv) a fit index, all of which are disclosed and described herein.

For example, embodiments of this disclosure described herein may be enabled in computer executable instructions which may be organized into routines, subroutines, procedures, objects, methods, functions, or any other organization of computer-executable instructions that is known or becomes known to a skilled artisan in view of this disclosure, where the computer-executable instructions are configured to direct one or more computing devices 1300 or other data processing device to perform the methods processes, and/or sub-processes (or functions thereof) disclosed herein. The computer-executable instructions may be written in any suitable programming language, non-limiting examples of which include C, C++, C#, Visual Basic, Java, Python, Perl, PHP, Html, CSS, and JavaScript.

The data storage 1308 comprises tangible, non-transitory computer-readable media, which may include one or more volatile and/or non-volatile storage components. The data storage 1308 components may include one or more magnetic, optical, and/or flash memory components and/or perhaps disk storage for example. In some embodiments data storage 1308 may be integrated in whole or in part with the one or more processors 1306 and/or the communication interface(s) 1302, for example. Additionally or alternatively, data storage 1308 may be provided separately as tangible, non-transitory computer readable media that is communicatively coupled to the computing device 1300, such as a separate database system for example.

In operation, the data storage 1308 may hold (e.g., contain, store, or otherwise be encoded with) program instructions 1310 (e.g., machine language instructions or other program logic, markup or the like) executable by the one or more processors 1306 to carry out one or more of the various functions described herein, including but not limited to one or more steps or aspects of the virtual apparel fitting processes disclosed described herein. The data storage 1308 may also hold reference data such as any of the user profile information disclosed and/or described herein for use in executing the methods, processes, and/or sub-processes (or functions thereof) described herein.

Some embodiments have been described with reference to particular features and functions. In view of the disclosure herein, it will be apparent to those skilled in the art that various modifications and variations can be made to the embodiments disclosed and described herein without departing from the scope or spirit of the invention(s). One skilled in the art will recognize that the disclosed features and functions may be used singularly, in any combination, or omitted based on the requirements and specifications of a given application or design.

We claim:

1. Tangible, non-transitory computer readable media comprising instructions encoded therein, wherein the instructions, when executed by one or more processors, cause a computing system to perform a method comprising:

generating a plurality of garment images for a garment based on a single digital image of the garment, wherein each garment image corresponds to a different size of the garment;

generating a user image for a user based on a digital photograph of the user according to a procedure comprising (i) receiving the digital photograph of the user, (ii) determining prospective user fit points for the user, (iii) aligning the prospective user fit points with technical mannequin fit points in an image of a technical mannequin, and (iv) shifting the prospective user fit points in the digital photograph of the user to align with the technical mannequin fit points;

receiving a selection comprising the garment;

in response to receiving the selection comprising the garment, generating an image of the user wearing the garment based on an alignment of garment fit points in one garment image of the plurality of garment images with corresponding user fit points in the user image; and causing the image of the user wearing the garment to be displayed in a graphical user interface.

2. The tangible, non-transitory computer readable media of claim 1, wherein generating a plurality of garment images for a garment based on a single digital image of the garment, wherein each garment image corresponds to a different size of the garment comprises:

receiving a digital image of a mannequin wearing a reference size of the garment;

generating a reference image for the reference size of the garment by removing the mannequin from the digital image of the mannequin wearing the reference size of the garment, wherein the reference image comprises a plurality of reference image regions;

generating a first garment image for a first size of the garment, wherein the first size is smaller than the reference size, wherein generating the first garment image comprises shrinking the reference image in each reference image region by an amount corresponding to a difference between (i) an amount of fabric within each of a plurality of physical regions of the reference size of the garment, wherein each physical region of the reference size of the garment corresponds to a reference image region in the reference image and (ii) an amount of fabric within each of a plurality of physical regions of the first size of the garment, wherein each physical region of the first size of the garment corresponds to a reference image region in the reference image; and generating a second garment image for a second size of the garment, wherein the second size is larger than the reference size, wherein generating the second garment image comprises expanding the reference image in each reference image region by an amount corresponding to a difference between (i) an amount of fabric within each of a plurality of physical regions of the reference size of the garment, wherein each physical region of the reference size of the garment corresponds to a reference image region in the reference image and (ii) an amount of fabric within each of a plurality of physical regions of the second size of the garment, wherein each physical region of the second size of the garment corresponds to a reference image region in the reference image.

3. The tangible, non-transitory computer readable media of claim 1, wherein the digital photograph of the user comprises an image of the user standing in front of a background, and wherein generating the user image for the user based on the digital photograph of the user further comprises:

receiving a calibration image from the user, wherein the calibration image comprises the background; and extracting an image of the user from the digital photograph of the user based on a comparison of the digital photograph with the calibration image.

4. The tangible, non-transitory computer readable media of claim 1, wherein receiving a selection comprising the garment comprises receiving: (i) an identification of the garment and (ii) an identification of a size of the garment.

5. The tangible, non-transitory computer readable media of claim 1, wherein the image of the user wearing the garment comprises a two-dimensional image of the user wearing the garment.

6. The tangible, non-transitory computer readable media of claim 1, wherein the single digital image of the garment is a first digital image from a set of digital images of the garment comprising a front view of the garment, a side view of the garment, and a rear view of the garment, wherein the user image is a first user image from a set of user images comprising a front view of the user, a side view of the user, and a rear view of the user, wherein the plurality of garment images is a first plurality of garment images, and wherein the method further comprises:

generating a second plurality of garment images for the garment based on a second digital image of the garment from the set of digital images of the garment, wherein each garment image in the second plurality of garment images corresponds to a different size of the garment;

in response to receiving the selection comprising the garment, generating an additional image of the user wearing the garment based on an alignment of garment fit points in one garment image of the second plurality of garment images with corresponding user fit points in a second user image of the set of user images; and causing the additional image of the user wearing the garment to be displayed in the graphical user interface.

7. The tangible, non-transitory computer readable media of claim 1, comprising:

receiving a three-dimensional model of a mannequin wearing a reference size of the garment;

generating a three-dimensional reference garment model for the reference size of the garment by removing the mannequin from the three-dimensional model of the mannequin wearing the reference size of the garment, wherein the three-dimensional reference garment model comprises a plurality of reference garment model regions;

generating a first three-dimensional garment model for a first size of the garment, wherein the first size is smaller than the reference size, wherein generating the first three-dimensional garment model comprises shrinking the three-dimensional reference garment model in each reference garment model region by an amount corresponding to a difference between (i) an amount of fabric within each of a plurality of physical regions of the reference size of the garment, wherein each physical region of the reference size of the garment corresponds to a reference garment model region in the three-dimensional reference garment model and (ii) an amount of fabric within each of a plurality of physical regions of the first size of the garment, wherein each physical region of the first size of the garment corresponds to a reference garment model region in the three-dimensional reference garment model; and generating a second three-dimensional garment model for a second size of the garment, wherein the second size is larger than the reference size, wherein generating the second three-dimensional garment model comprises expanding the three-dimensional reference garment model in each reference garment model region by an amount corresponding to a difference between (a) an amount of fabric within each of a plurality of physical regions of the reference size of the garment, wherein each physical region of the reference size of the garment corresponds to a reference garment model region in the three-dimensional reference garment model and (b) an amount of fabric within each of a plurality of physical regions of the second size of the garment, wherein each physical region of the second size of the garment corresponds to a reference garment model region in the three-dimensional reference garment model.

8. The tangible, non-transitory computer readable media of claim 7, wherein generating the user image for the user based on the digital photograph of the user comprises:
receiving a three-dimensional model of the user;
determining user fit points for the user in the three-dimensional model of the user;
aligning the user fit points with technical mannequin fit points in a three-dimensional model of a technical mannequin; and
shifting the user's fit points to align with the technical mannequin fit points.

9. The tangible, non-transitory computer readable media of claim 1, wherein the method further comprises:
generating a fit index for the garment based at least in part on a difference between (i) a value of a measurement point of the user and (ii) a value of a corresponding measurement point of a fit model for the garment; and
causing a representation of the fit index for the garment to be displayed in the graphical user interface.

10. The tangible, non-transitory computer readable media of claim 9, wherein the fit model for the garment comprises a plurality of measurement points, and wherein generating a fit index for the garment based at least in part on a difference between (i) a value of a measurement point of the user and (ii) a value of a corresponding measurement point of the fit model for the garment comprises:
for each measurement point of the fit model for the garment, (i) determining a difference between the measurement point of the user and the corresponding measurement point of the fit model for the garment, (ii) generating a raw score by dividing the determined difference by a measurement range for the measurement point of the fit model for the garment, wherein the measurement range is based at least in part on a grade rule for the garment, and (iii) multiplying the raw score by a weighting factor to generate a weighted score for the measurement point of the fit model for the garment; and
generating a fit index for the garment at least in part by summing the weighted scores for each measurement point of the fit model for the garment.

11. The tangible, non-transitory computer readable media of claim 9, wherein the fit model for the garment comprises a plurality of measurement points, and wherein generating a fit index for the garment based at least in part on a difference between (i) a value of a measurement point of the user and (ii) a value of a corresponding measurement point of the fit model for the garment comprises:
for each measurement point of the fit model for the garment, (i) determining a difference between the measurement point of the user and the corresponding measurement point of the fit model for the garment, (ii) based on the determined difference, assigning a raw score for the measurement point of the fit model for the garment from a table based at least in part on a grade rule for the garment, and (iii) multiplying the raw score by a weighting factor to generate a weighted score for the measurement point of the fit model for the garment; and
generating a fit index for the garment at least in part by summing the weighted scores for each measurement point of the fit model for the garment.

12. The tangible, non-transitory computer readable media of claim 9, wherein the fit model for the garment comprises a plurality of measurement points, and wherein generating a fit index for the garment based at least in part on a difference between (i) a value of a measurement point of the user and (ii) a value of a corresponding measurement point of the fit model for the garment comprises:
for each measurement point of the fit model for the garment, (i) adjusting the measurement point of the fit model for the garment based on one or more user fit preferences, (ii) determining a difference between the measurement point of the user and the adjusted measurement point of the fit model for the garment, (iii) generating a raw score by dividing the determined difference by a measurement range for the measurement point of the fit model for the garment, wherein the measurement range is based at least in part on a grade rule for the garment, and (iv) multiplying the raw score by a weighting factor to generate a weighted score for the measurement point of the fit model for the garment; and
generating a fit index for the garment at least in part by summing the weighted scores for each measurement point of the fit model for the garment.

13. The tangible, non-transitory computer readable media of claim 9, wherein the fit model for the garment comprises a plurality of measurement points, and wherein generating a fit index for the garment based at least in part on a difference between (i) a value of a measurement point of the user and (ii) a value of a corresponding measurement point of the fit model for the garment comprises:
for each measurement point of the fit model for the garment, (i) adjusting the measurement point of the fit model for the garment based on one or more user fit preferences, (ii) determining a difference between the measurement point of the user and the adjusted measurement point of the fit model for the garment; (iii) based on the determined difference, assigning a raw score for the measurement point of the fit model for the garment from a table based at least in part on a grade rule for the garment, and (iv) multiplying the raw score by a weighting factor to generate a weighted score for the measurement point of the fit model for the garment; and
generating a fit index for the garment at least in part by summing the weighted scores for each measurement point of the fit model for the garment.

14. A method performed by a server system, the method comprising:
generating a plurality of garment images for a garment based on a single digital image of the garment, wherein each garment image corresponds to a different size of the garment, wherein generating the plurality of garment images based on a single digital image of the garment comprises (a) receiving a digital image of a mannequin wearing a reference size of the garment, (b) generating a reference image for the reference size of the garment by removing the mannequin from the digital image of the mannequin wearing the reference size of the garment, wherein the reference image comprises a plurality of reference image regions, (c) generating a first garment image for a first size of the garment, wherein the first size is smaller than the reference size, wherein generating the first garment image comprises shrinking the reference image in each reference image region by an amount corresponding to a difference between (i) an amount of fabric within each of a plurality of physical regions of the reference size of the garment, wherein each physical region of the reference size of the garment corresponds to a reference image region in the reference image and (ii) an amount of fabric within each of a plurality of physical regions of the first size of the garment, wherein each physical region of the first size of the garment corresponds to a reference image region in the reference image; (d) generating a second garment image for a second size of the garment, wherein the second size is larger than the reference size, wherein generating the second garment image comprises expanding the reference image in each reference image region by an amount corresponding to a difference between (i) an amount of fabric within each of a plurality of physical regions of the reference size of the garment, wherein each physical region of the reference size of the garment corresponds to a reference image region in the reference image and (ii) an amount of fabric within each of a plurality of physical regions of the second size of the garment, wherein each physical region of the second size of the garment corresponds to a reference image region in the reference image;

generating a user image for a user based on a digital photograph of the user;

receiving a selection comprising the garment comprising: (i) an identification of the garment and (ii) an identification of a size of the garment;

in response to receiving the selection comprising the garment, generating an image of the user wearing the garment based on an alignment of garment fit points in one garment image of the plurality of garment images with corresponding user fit points in the user image; and transmitting the image of the user wearing the garment to the user's computing device for display in a graphical user interface, wherein the image is one of a two-dimensional image of the user wearing the garment or an image of a three-dimensional model of the user wearing the garment.

15. The method of claim 14, wherein generating the user image for the user based on the digital photograph of the user comprises:

receiving a calibration image from the user, wherein the calibration image comprises a background;

receiving the digital photograph of the user, wherein the digital photograph of the user comprises an image of the user standing in front of the background;

extracting an image of the user from the digital photograph of the user based on a comparison of the digital photograph with the calibration image;

determining prospective user fit points for the user in the image of the user;

aligning the prospective user fit points with technical mannequin fit points in an image of a technical mannequin; and shifting the prospective user fit points in the image of the user to align with the technical mannequin fit points.

16. The method of claim 14, further comprising:

receiving a three-dimensional model of a mannequin wearing a reference size of the garment;

generating a three-dimensional reference garment model for the reference size of the garment by removing the mannequin from the three-dimensional model of the mannequin wearing the reference size of the garment, wherein the three-dimensional reference garment model comprises a plurality of reference garment model regions;

generating a first three-dimensional garment model for a first size of the garment, wherein the first size is smaller than the reference size, wherein generating the first three-dimensional garment model comprises shrinking the three-dimensional reference garment model in each reference garment model region by an amount corresponding to a difference between (i) an amount of fabric within each of a plurality of physical regions of the reference size of the garment, wherein each physical region of the reference size of the garment corresponds to a reference garment model region in the three-dimensional reference garment model and (ii) an amount of fabric within each of a plurality of physical regions of the first size of the garment, wherein each physical region of the first size of the garment corresponds to a reference garment model region in the three-dimensional reference garment model; and generating a second three-dimensional garment model for a second size of the garment, wherein the second size is larger than the reference size, wherein generating the second three-dimensional garment model comprises expanding the three-dimensional reference garment model in each reference garment model region by an amount corresponding to a difference between (i) an amount of fabric within each of a plurality of physical regions of the reference size of the garment, wherein each physical region of the reference size of the garment corresponds to a reference garment model region in the three-dimensional reference garment model and (ii) an amount of fabric within each of a plurality of physical regions of the second size of the garment, wherein each physical region of the second size of the garment corresponds to a reference garment model region in the three-dimensional reference garment model.

17. The method of claim 14, further comprising:

generating a fit index for the garment based at least in part on a difference between (i) a value of a measurement point of the user and (ii) a value of a corresponding measurement point of a fit model for the garment; and transmitting the fit index for the garment to the user's computing device for display in the graphical user interface.

18. The method of claim 17, wherein the fit model for the garment comprises a plurality of measurement points, and wherein generating a fit index for the garment based at least in part on a difference between (i) a value of a measurement point of the user and (ii) a value of a corresponding measurement point of the fit model for the garment comprises:

for each measurement point of the fit model for the garment, (i) determining a difference between the measurement point of the user and the corresponding measurement point of the fit model for the garment, (ii) generating a raw score by dividing the determined difference by a measurement range for the measurement point of the fit model for the garment, wherein the measurement range is based at least in part on a grade rule for the garment, and (iii) multiplying the raw score by a weighting factor to generate a weighted score for the measurement point of the fit model for the garment; and generating a fit index for the garment at least in part by summing the weighted scores for each measurement point of the fit model for the garment.

19. Tangible, non-transitory computer readable media comprising instructions encoded therein, wherein the instructions, when executed by one or more processors, cause a computing system to perform a method comprising:

generating a plurality of garment images for a garment based on a single digital image of the garment, wherein each garment image corresponds to a different size of the garment;

generating a user image for a user based on a digital photograph of the user, wherein generating the user image for the user comprises (a) receiving a calibration image from the user, wherein the calibration image comprises a background, (b) receiving the digital photograph of the user, wherein the digital photograph of the user comprises an image of the user standing in front of the background, (c) extracting an image of the user from the digital photograph of the user based on a comparison of the digital photograph with the calibration image, (d) determining prospective user fit points for the user in the image of the user, (e) aligning the prospective user fit points with technical mannequin fit points in an image of a technical mannequin, and (f) shifting the prospective user fit points in the image of the user to align with the technical mannequin fit points;

receiving a selection comprising the garment;

in response to receiving the selection comprising the garment, generating an image of the user wearing the garment based on an alignment of garment fit points in one garment image of the plurality of garment images with corresponding user fit points in the user image; and causing the image of the user wearing the garment to be displayed in a graphical user interface.

20. The tangible, non-transitory computer readable media of claim 19, wherein the image of the user wearing the garment comprises at least one of a two-dimensional image or a three-dimensional image.

* * * * *